(12) United States Patent
Uchida

(10) Patent No.: US 8,259,171 B2
(45) Date of Patent: Sep. 4, 2012

(54) DIGITAL CAMERA SYSTEM FOR MICROSCOPE AND MICROSCOPE SYSTEM, WHERE OUTPUT DEPENDS ON CHANGE IN OBSERVATION MAGNIFICATION AFTER MEASUREMENT VALUE IS DISPLAYED

(75) Inventor: Tomohiro Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 332 days.

(21) Appl. No.: 12/627,309

(22) Filed: Nov. 30, 2009

(65) Prior Publication Data

US 2010/0141751 A1 Jun. 10, 2010

(30) Foreign Application Priority Data

Dec. 8, 2008 (JP) ................................ 2008-312286

(51) Int. Cl.
 *H04N 9/47* (2006.01)
 *H04N 5/243* (2006.01)
 *H04N 7/18* (2006.01)

(52) U.S. Cl. ............................. 348/79; 348/80; 382/128

(58) Field of Classification Search .................... 348/79, 348/80; 359/385–390; 382/182
See application file for complete search history.

(56) References Cited

U.S. PATENT DOCUMENTS

| 7,239,733 B2 | 7/2007 | Abe et al. |
| 7,969,464 B2 * | 6/2011 | Uchida ........................... 348/79 |
| 2003/0012418 A1 * | 1/2003 | Uchida et al. ................. 382/128 |

FOREIGN PATENT DOCUMENTS

| EP | 1 764 640 A2 | 3/2007 |
| EP | 1 990 668 A2 | 11/2008 |
| JP | 2000-155268 | 6/2000 |
| JP | 2003-32524 | 1/2003 |
| JP | 2005-27904 | 2/2005 |

OTHER PUBLICATIONS

Extended European Search Report dated Jun. 30, 2010.

* cited by examiner

*Primary Examiner* — Haresh N Patel
(74) *Attorney, Agent, or Firm* — Scully, Scott, Murphy & Presser, P.C.

(57) ABSTRACT

An imaging system for a microscope comprises: an imaging unit imaging an optical image from a microscope; a display unit displaying the imaged image; a specifying unit specifying at least a given position on the displayed image to set a measurement target; a measurement and drawing unit performing measurement of the measurement target and drawing of the measurement target, as well as making a measurement value obtained by the measurement displayed at a predetermined position on the screen; a magnification change determination unit determining whether there has been a change in an observation magnification of the microscope; a control unit performing, when it is determined that there has been a change in the observation magnification of the microscope after the measurement value is displayed, an output in accordance with the change.

16 Claims, 36 Drawing Sheets

OBSERVATION FIELD OF
VIEW WITH n-TIMES
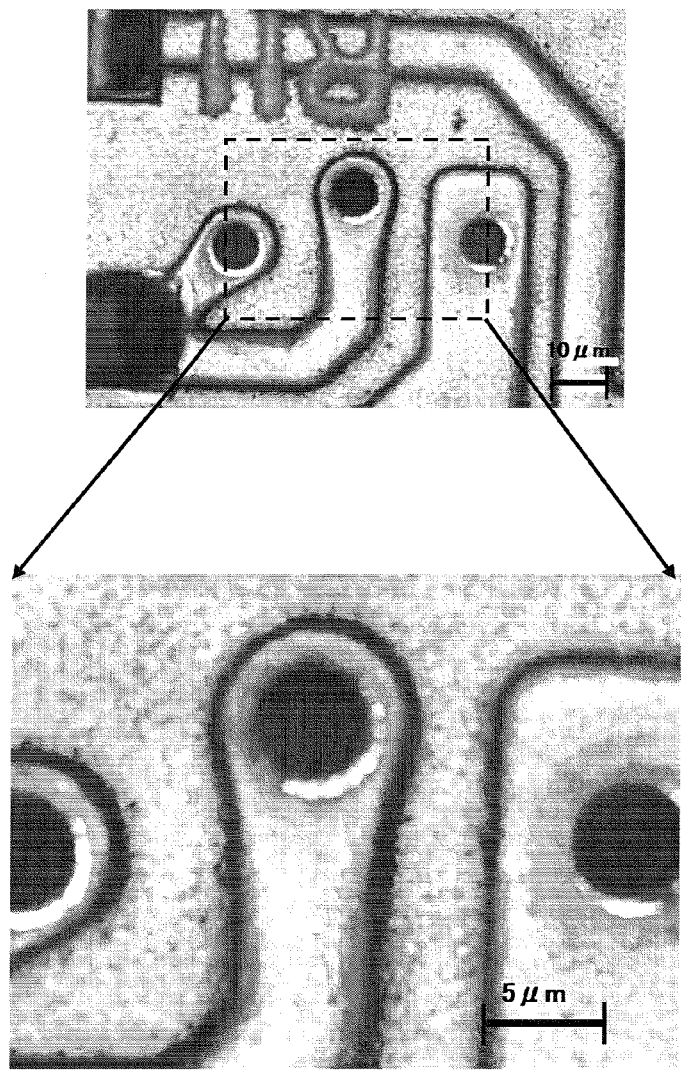
OBSERVATION FIELD OF VIEW WITH m-TIMES (n<m)
CENTER PART AREA IN BROKEN LINE IN OBSERVATION
FIELD OF VIEW WITH n-TIMES IS ENLARGED
F I G. 1 7

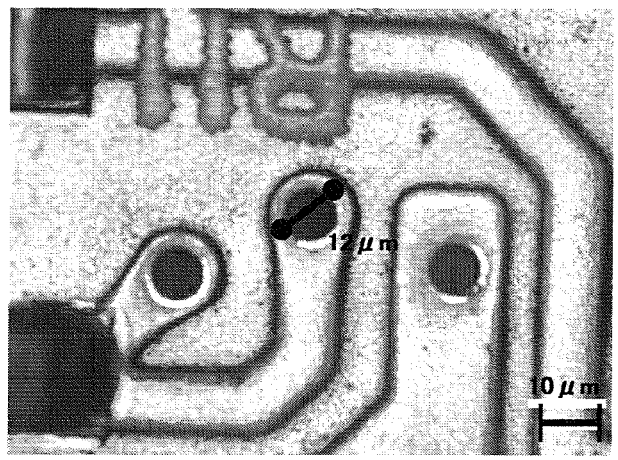
MEASUREMENT WITH n-TIMES
F I G. 2 3 A

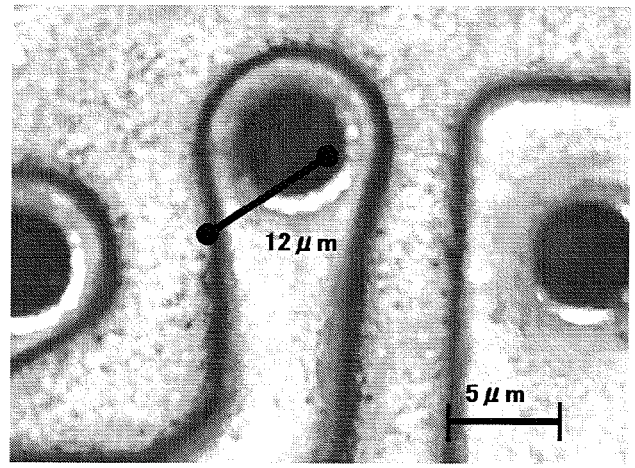
MEASUREMENT WITH m-TIMES
(WHEN OBJECTIVE MAGNIFIATION IS
CHANGED FROM n-TIMES TO m-TIMES)
F I G. 2 3 B

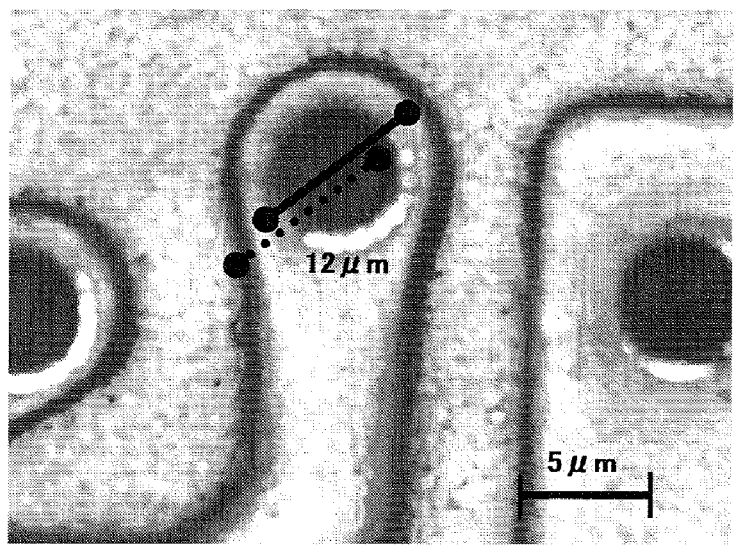
MEASUREMENT DRAWING IN BROKEN LINE
IS MOVED TO POSITION OF SOLID LINE
BY POSITION FINE ADJUSTMENT
FUNCTION
F I G. 2 5

WHEN OBJECTIVE MAGNIFICTION IS
CHANGED FROM n-TIMES TO m-TIMES

DIGITAL CAMERA SYSTEM FOR MICROSCOPE AND MICROSCOPE SYSTEM, WHERE OUTPUT DEPENDS ON CHANGE IN OBSERVATION MAGNIFICATION AFTER MEASUREMENT VALUE IS DISPLAYED

CROSS REFERENCE TO RELATED APPLICATION

This application is based on and claims the benefit of priority from the prior Japanese Patent Application No. 2008-312286 filed in Japan on Dec. 8, 2008, the entire contents of which are incorporated by this reference.

BACKGROUND OF THE INVENTION

1. Field of the Invention

The present invention relates to the control of measurement and display functions of an imaging system for a microscope.

2. Description of the Related Art

Some digital cameras for microscopes are equipped with a scale function for figuring out the size of an observed image or a measurement function for measuring the distance between given two points in an observed image.

The scale function is a function of, for figuring out the size of an observed image, displaying a scaled ruler, or reporting the magnification of the microscope to the observer. In the case of a microscope digital camera, the reported content is displayed over the observed image, as a general reporting method. The scale is generally displayed with its position being fixed on a margin of the image, such as the bottom right of the image.

With the measurement function, when the observer draws a straight line between given two points or a circle connecting given three points on the observed image, the length of the straight line or the area of the circle is calculated and displayed. Accordingly, information of the distance, area and the like regarding a target substance in the observed image can be obtained.

Japanese Laid-open Patent Publication No. 2000-155268 discloses the display of a scale on a margin of a display area on a screen displaying an image. In addition, it discloses that when given two points on the screen are specified using a pointer displayed on the screen, the actual distance between the given two points is displayed together with the magnification for the observation used at the time when the drawing between the two points is performed. In Japanese Laid-open Patent Publication No. 2000-155268, according to the disclosed circuit configuration, the scale or the drawing between two points is not embedded in the image, and displayed on the image only on the display screen (the scale and drawing between two points cannot be saved with the image).

Japanese Laid-open Patent Publication No. 2005-27904 discloses that, in a radiological image display apparatus, the distance (fixed at the magnification if ×1) and the distance converted with a set magnification of given two points on an image can be displayed.

Japanese Laid-open Patent Publication No. 2003-32524 discloses the scale display on a camera image by setting the microscope magnification in the camera. In addition, by setting the microscope magnification in the setting at the camera side, a scale display that is suitable for the observed image can be performed. In addition, the scale can be displayed over a live image, as well as over a recorded still image.

Therefore, according to Japanese Laid-open Patent Publication No. 2003-32524, character strings of shooting conditions, scale and the like can be displayed on an observed image of the microscope, and image recording can be performed while embedding the character strings in the image. The size of the character strings can be expanded or reduced to a size that is easy to see on the screen display. Furthermore, at the time when the image recording is performed, the character strings can be recorded in a size (font size) that is different from the size at the time of screen display.

Accordingly, for example, compared to the font size (the pixel size per one character in the character string) for a monitor resolution of 640×480, in the case when the monitor resolution is 320×240, the font size is reduced automatically. This optimizes the size of the character string for the observed image on the screen (the visual size of the character string).

SUMMARY OF THE INVENTION

An imaging system for a microscope according to the present invention comprises:

an imaging unit imaging an optical image from a microscope;

a display unit displaying the imaged image;

a specifying unit specifying at least a given position on the displayed image to set a measurement target;

a measurement and drawing unit performing measurement of the measurement target and drawing of the measurement target, as well as making a measurement value obtained by the measurement displayed at a predetermined position on a screen;

a magnification change determination unit determining whether there has been a change in an observation magnification of the microscope;

a control unit performing, when it is determined that there has been a change in the observation magnification of the microscope after the measurement value is displayed, an output in accordance with the change.

Meanwhile, a microscope system according to the present invention comprises:

a microscope having a stage movable at least in a direction perpendicular to an optical-axis direction;

an imaging unit imaging an optical image from a microscope;

a display unit displaying the imaged image;

a specifying unit specifying at least a given position on the displayed image to set a measurement target;

a measurement and drawing unit performing measurement of the measurement target and drawing of the measurement target, as well as making a measurement value obtained by the measurement displayed at a predetermined position on a screen;

a magnification change determination unit determining whether there has been a change in an observation magnification of the microscope;

a control unit performing, when it is determined that there has been a change in the observation magnification of the microscope after the measurement value is displayed, an output in accordance with the change.

BRIEF DESCRIPTION OF THE DRAWINGS

FIG. 17 illustrates examples of the observation field of view at an n-times magnification and the observation field of view at an m-times magnification in the second embodiment.

FIG. 23A and FIG. 23B illustrate a case in which, after measurement between two points with the n-times magnification is performed in the fourth embodiment, the objective magnification is changed to m-times.

FIG. 25 is a diagram explaining the fine adjustment of the misaligned drawing position after the change of the drawing of measurement between two points in accordance with the objective magnification change in the fourth embodiment.

DESCRIPTION OF THE PREFERRED EMBODIMENTS

Figure 1:
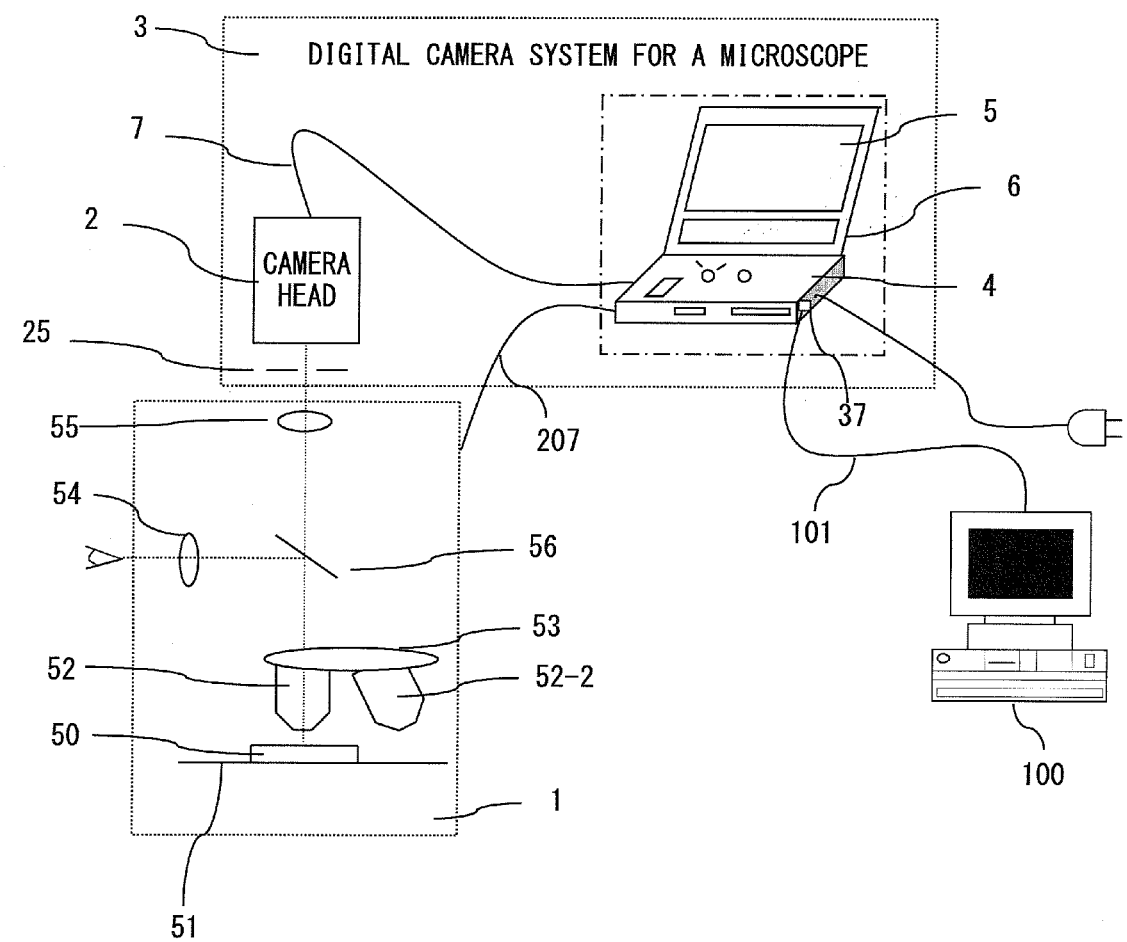
FIG. 1 illustrates the configuration outline of a microscope system in the first embodiment.

According to Japanese Laid-open Patent Publication No. 2000-155268, following the change of the magnification of the zoom lens of a microscope, the graduation of the scale displayed on a margin of the image can be optimized in accordance with the magnification. However, for the position between given two points (P1 and P2 in FIG. 3 in Japanese Laid-open Patent Publication No. 2000-155268) and a straight line connecting the two points in an observed image, the change of the magnification of the microscope cannot be followed.

Depending on the relationship between the position of the observed image and the magnification of the microscope, the observation target on which a straight line between two points is drawn may not stay within the screen. In this case, the drawing of the straight line between two lines cannot be moved to follow the move of the observation target. For example, in a case in which a straight line is drawn between two points for an observed subject that is located on a relatively marginal position of a screen with a low magnification such as ×1, ×2 etc., when a change to a high magnification such as ×10, ×20 etc. is performed, the observation target moves out of the screen field of view (since the center part of the observation field of view at the low magnification is enlarged, the observed subject at the margin of the field of view with the low magnification moves out of the field of view). No measure for coping with the observation target moving out of the screen in this situation has been disclosed. Furthermore, no action under this situation has been disclosed for the straight line between two points drawn on the screen.

According to Japanese Laid-open Patent Publication No. 2005-27904, even when the magnification is changed, the measurement display with the drawing such as the measurement between two points is not changed. Therefore, the change of the magnification causes disagreement between the observed image and the measurement display with the drawing.

According to Japanese Laid-open Patent Publication No. 2003-32524, the measurement cannot be performed. Meanwhile, the font size of the character string with respect to the display monitor resolution can be changed. However, the font size of the character string cannot be changed in accordance with the change of the magnification of the microscope. In addition, for performing the scale display correctly, the magnification-change setting of the camera device needs to be manually operated when the magnification of the microscope is changed. Therefore, the scale display value may be wrong before and after the magnification change of the microscope, due to the omission of the manual operation, wrong setting, and the like.

Therefore, embodiments of the present invention provide an imaging system for a microscope and a microscope system with which the optimal measurement can be performed even when the magnification of the microscope is changed, offering good usability and reducing operation mistakes.

An imaging system according to the embodiments of the present invention has an imaging unit, a display unit, a specifying unit, a measurement and drawing unit, a magnification change determination unit and a control unit.

The imaging unit images an optical image from a microscope. The imaging unit corresponds to, in the embodiments of the present invention for example, an imaging device 20.

The display unit displays the imaged image. The display unit corresponds to, in the embodiments of the present invention for example, a display unit 5 or a display of a PC 100.

The specifying unit specifies at least a given position on the image displayed on a display device to set a measurement target. The specifying unit corresponds to, in the embodiments of the present invention for example, a predetermined switch (SW 61, 62 etc.) on an operation unit 4, or an operation key on the PC 100.

The measurement and drawing unit performs measurement of the measurement target and drawing of the measurement target, and also makes the measurement value obtained by the measurement displayed on a predetermined position on the screen. The measurement and drawing unit corresponds to, in the embodiments of the present invention for example, a CPU 201.

The magnification change determination unit determines whether there has been a change in the observation magnification of the microscope. The magnification change determination unit corresponds to, in the embodiments of the present invention for example, objective change determination units 66, 66-1 and 66-2.

The control unit performs, when it is determined that there has been a change in the observation magnification of the microscope after the measurement value is displayed, an output in accordance with the change. The control unit corresponds to, in the embodiments of the present invention for example, the CPU 201.

With such a configuration, the optimal measurement can be performed even when the magnification of the microscope is changed, which offers good usability and reduces operation mistakes.

Meanwhile, according to the first embodiment of the present invention, the control unit outputs that the measurement value is a value measured before the change in the magnification and does not correspond to an image after the change in the magnification.

With such a configuration, when the observation magnification is changed, an alert that the measurement result is incorrect for the image after the change in the magnification can be issued.

Meanwhile, according to the second embodiment of the present invention, the control unit determines, when a change is performed from n-times to m-times (n<m), whether the measurement target with n-times moves out of an area of an observation field of view with m-times, and when the measurement target moves out of the area of the observation field of view with m-times, an alert can be displayed accordingly.

With such a configuration, when the observation magnification changed and the measurement target before the magnification change does not exist in the screen, a "out of measurement field of view error" can be displayed.

Meanwhile, according to the second embodiment of the present invention, the control unit determines, when a change is performed from m-times to n-times (n<m), whether a measurement target with m-times becomes smaller than a minimum resolution for measurement in n-times observation, and when the measurement target becomes smaller than the minimum resolution for measurement in n-times observation, an alert can be displayed accordingly.

With such a configuration, when the observation magnification is changed and the measured place before the change cannot be measured with the magnification after change, a "smaller than measurement resolution error" can be displayed.

Meanwhile, according to the third embodiment of the present invention, the measurement and drawing unit calculates, in an image after the change in the magnification, a position corresponding to the specified position in an image before the change in the magnification to reset a measurement target after the change in the magnification, and performs measurement and redrawing of the reset measurement target, and a measurement value obtained by the measurement can be redisplayed at a predetermined position on the screen.

With such a configuration, when the observation magnification is changed, the measurement drawing before the magnification change can be redrawn in accordance with the magnification after the change.

In addition, according to the fourth embodiment of the present invention, the imaging system for a microscope may further comprise a position and size adjustment unit. The position and size adjustment unit can adjust the position and the size of the redrawn measurement target. The position and size adjustment unit corresponds to, in the embodiments of the present invention for example, a left selection SW 61, a right selection SW 62, an up selection SW (not illustrated in the drawing), a down selection SW (not illustrated in the drawing), and the like.

Meanwhile, according to the fourth embodiment of the present invention, the imaging system for a microscope may further comprise an eccentricity information holding unit. The eccentricity information holding unit can hold eccentricity information for each magnification of the microscope. The eccentricity information holding unit corresponds to, in the embodiments of the present invention for example, a ROM 201-2 or a RAM 201-3.

In this case, the measurement and drawing unit can calculate, in an image after the change in the magnification, a position corresponding to the specified position in an image before the change in the magnification, on the basis of the eccentricity information.

With such a configuration, the eccentric state of each objective lens is stored in the initial setting, and misalignment of the positions of the starting point and the ending point due to the eccentricity of the objective lens can be automatically fine-adjusted in the measurement drawing with the magnification change.

Meanwhile, according to the fifth embodiment of the present invention, the imaging system for a microscope may further comprise a stage movement amount obtaining unit. The stage movement amount obtaining unit can obtain, from the microscope, the movement amount of the stage of the microscope. The stage movement amount obtaining unit corresponds to, in the embodiments of the present invention for example, a communication unit for microscope 209.

In this case, the measurement and drawing unit can move, on basis of the stage movement amount, the specified position consecutively, and perform drawing of the measurement target at the position after the move.

With such a configuration, drawing of the measurement target can be performed in conjunction with stage movement.

Meanwhile, according to the fifth embodiment of the present invention, the control unit determines, when a change is performed from n-times to m-times (n<m), whether the measurement target with n-times moves out of an area of an observation field of view with m-times, and when the measurement target with n-times moves out of the area of the observation field of view with m-times, and a movement amount of a stage of the microscope for moving the measurement target inside the area of the observation field of view with m-times can be displayed.

With such a configuration, when the magnification is changed from n-times to m-times and the measurement target moves out of the observation field of view, an alert can be issued accordingly, together with how much the stage needs to be moved to move the measurement target inside the observation field of view.

Meanwhile, according to the sixth embodiment of the present invention, the imaging system for a microscope may further comprise a drawing information writing unit and a saving unit.

The drawing information writing unit writes drawing information drawn by the measurement and drawing unit into an image in which the measurement target is imaged. The drawing information writing unit corresponds to, in the embodiments of the present invention for example, an observed image-character string combiner 64.

The saving unit saves the image in which the drawing information has been written. The saving unit corresponds to, in the embodiments of the present invention for example, a recoding medium read/write device 34.

With such a configuration, the measurement result can be written into the image and recorded every time measurement is performed.

Hereinafter, a plurality of embodiments of the imaging system for a microscope according to the present invention and their variation examples are described in detail.

First Embodiment

This embodiment describes a digital camera system for a microscope that alerts, when the magnification of the objective lens is changed, that the measurement result displayed on the screen is the one before the change of the magnification.

FIG. 1 illustrates the configuration outline of a microscope system in the present embodiment. The microscope system has, at least, a microscope main body 1 and a digital camera system for a microscope 3. In FIG. 1, the digital camera system for a microscope 3 is mounted on the microscope main body 1.

The microscope main body 1 has a stage 51, objective lenses 52, a revolver 53, an ocular lens 54, an imaging lens 55, a beam splitter 56.

A sample 50 is placed on the stage 51. The objective lenses 52 are for observing the sample 50 on an optical axis 53 while changing the magnification. The objective lenses 52 are installed on the revolver 53. The ocular lens 54 is for the observer to look through.

The revolver 53 has a rotating mechanism that is capable of holding a plurality of objective lenses and placing the objective lenses inside and outside of the observation optical path. By rotating the revolver 53, one of the plurality of objective lenses can be inserted into the observation optical path. In FIG. 1, the objective lens 52 is placed inside the optical path, and the objective lens 52-2 is outside the optical path.

The light from a light source that is not illustrated in the drawing is cast on the sample 50. The light cast on the sample 50 enters the beam splitter 56 through the objective lens. The beam splitter 56 splits the light into the ocular lens 54 side and a camera head unit side 2. With the optical image split for the ocular lens side 54, the sample image can be viewed by the naked eye through the ocular lens. The light split for the imaging lens 55 side enters the camera head unit 2 through the imaging lens 55.

The digital camera system for a microscope 3 consists of a shutter 25, the camera head unit 2, and an operation and display unit 6. The camera head unit 2 is placed on the optical path of the light emitted from the microscope main body 1. The operation and display unit 6 is separate from the camera head unit 2.

The operation and display unit 6 has an operation unit 4 and a display unit 5. The operation unit 4 is used for operating the camera head unit 2. The display unit 5 is capable of displaying the sample image guided to the camera head unit 2. The display unit 5 has functions not only to display the sample image but also to display various shooting settings and the like performed by the operation unit 4.

The camera head unit 2 and the operation and display unit are connected by a cable 7, to be capable of transmitting/receiving an electric signal to/from each other. Therefore, even if the operation and display unit 6 is disposed away from the camera head unit 2, as long as it is within the range of the length of the cable 7, the photo shooting operation by the camera head unit 2 can be conducted.

Meanwhile, the operation unit 4 and the display unit 5 are fixed while maintaining a predetermined angle. When the operation and display unit 6 is placed on a desk, the operation unit 4 is fixed approximately parallel to the desk. The display unit 5 is fixed at an angle within the range of 0-90° to the desk with which it can be easily operated by the observer, for example at about 90°. Here, the state at 0° refers to a state in which the operation unit 4 and the display unit 5 are parallel, that is, an image display panel 41 and various SWs (switches) of the operation unit such as a mode switch (SW) 32 are placed on the same plane.

A communication terminal 37 is a terminal for connecting with an external device such as a PC to control the external device. The communication terminal 37 is connected to a personal computer PC 100 through a cable 101. Furthermore, the microscope main body 1 and the operation unit 4 of the digital camera system for a microscope 3 are connected by a microscope-camera connection cable 207, to be capable of transmitting/receiving an electric signal to/from each other.

Figure 2:
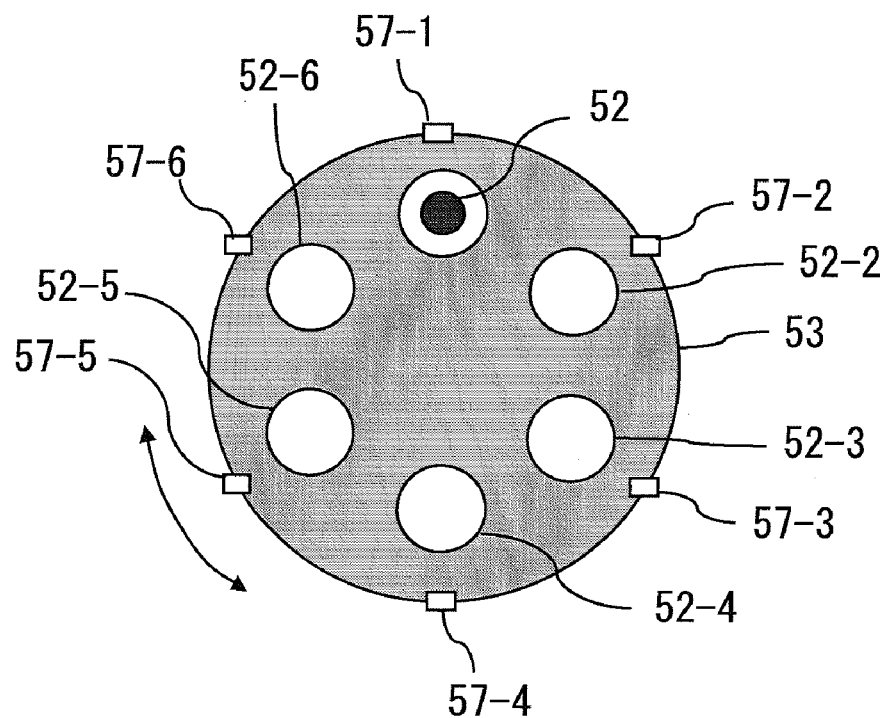
FIG. 2 illustrates the configuration outline of a revolver 53 in the first embodiment.

FIG. 2 illustrates the configuration outline of the revolver 53 in the present embodiment. In FIG. 2, the revolver 53 is equipped with holes so that six objective lenses can be installed. For example, six kinds of objective lenses that respectively have different magnifications such as ×2, ×4, ×10, ×20, ×40, ×100, etc are installed in the six holes. By rotating the revolver 53 in accordance with the observed part of the sample being the observation target, one of the objective lens can be inserted into the optical path. The part other than the holes (shaded part) is a light shielding member.

Hole identifying tags 57 (57-1 through 57-6) are attached to the revolver 53 so that which objective lens of the plurality of objective lenses is in the optical path can be determined. Codes (hole identifying information) that identify the respective holes of the revolver are assigned to the hole identifying tags 57, which are placed around their corresponding holes.

In this case, by reading the hole identifying information corresponding to the hole in which the objective lens inserted in the observation optical path is installed, which of the holes (where the objective lenses are placed) of the revolver 53 in which the six objective lenses 52, 52-2 through 52-6 are installed exists in the optical path can be determined.

In this embodiment, the objective lens that is on the optical path is indicated with the numeral 52, and the objective lenses that are outside the optical path are indicated with the numerals 52-2 through 52-6. In FIG. 2, the hole identifying tag 57-1 is a tag corresponding to the objective lens 52. The hole identifying tag 57-2 is a tag corresponding to the objective lens 52-2. The hole identifying tag 57-3 is a tag corresponding to the objective lens 52-3. The hole identifying tag 57-4 is a tag corresponding to the objective lens 52-4. The hole identifying tag 57-5 is a tag corresponding to the objective lens 52-5. The hole identifying tag 57-6 is a tag corresponding to the objective lens 52-6.

Figure 3:
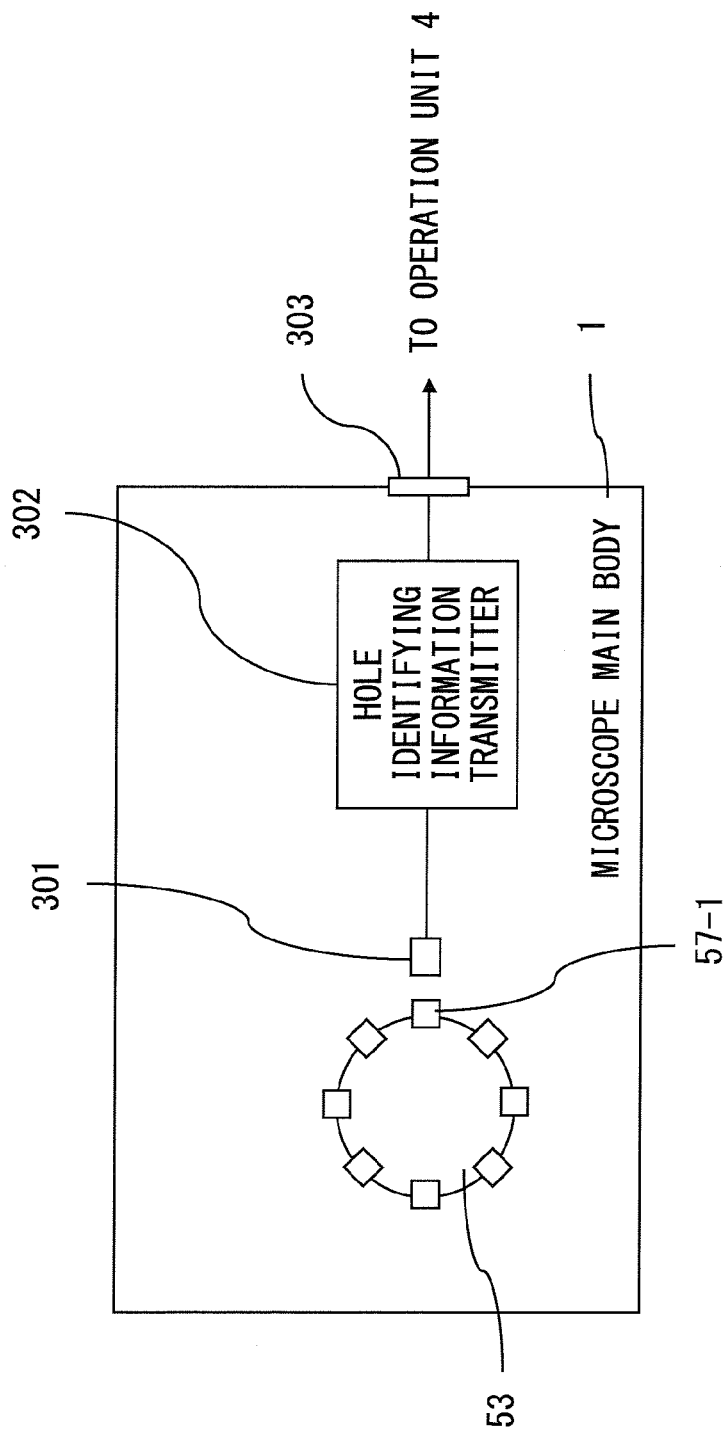
FIG. 3 illustrates the electrical internal configuration of a microscope main body 1 in the first embodiment.

FIG. 3 illustrates the electrical internal configuration of the microscope main body 1 in the present embodiment. In FIG. 3, the microscope main body 1 has the revolver 53, a hole identifying tag sensor 301, a hole identifying information transmitter 302, and a camera connection connector 303.

The configuration is made so that when one of the objective lenses installed on the revolver 53 is in the optical path, the hole identifying tag corresponding to the objective lens closely faces the hole identifying tag sensor 301. The hole identifying tag sensor 301 reads the hole identifying information of the closely facing hole identifying tag and outputs it to the hole identifying information transmitter 302. The hole identifying information transmitter 302 converts the hole identifying information into a communication command, and transmits it to the operation unit 4 of the digital camera system for a microscope 3 through the camera connection connector 303.

Figure 4:
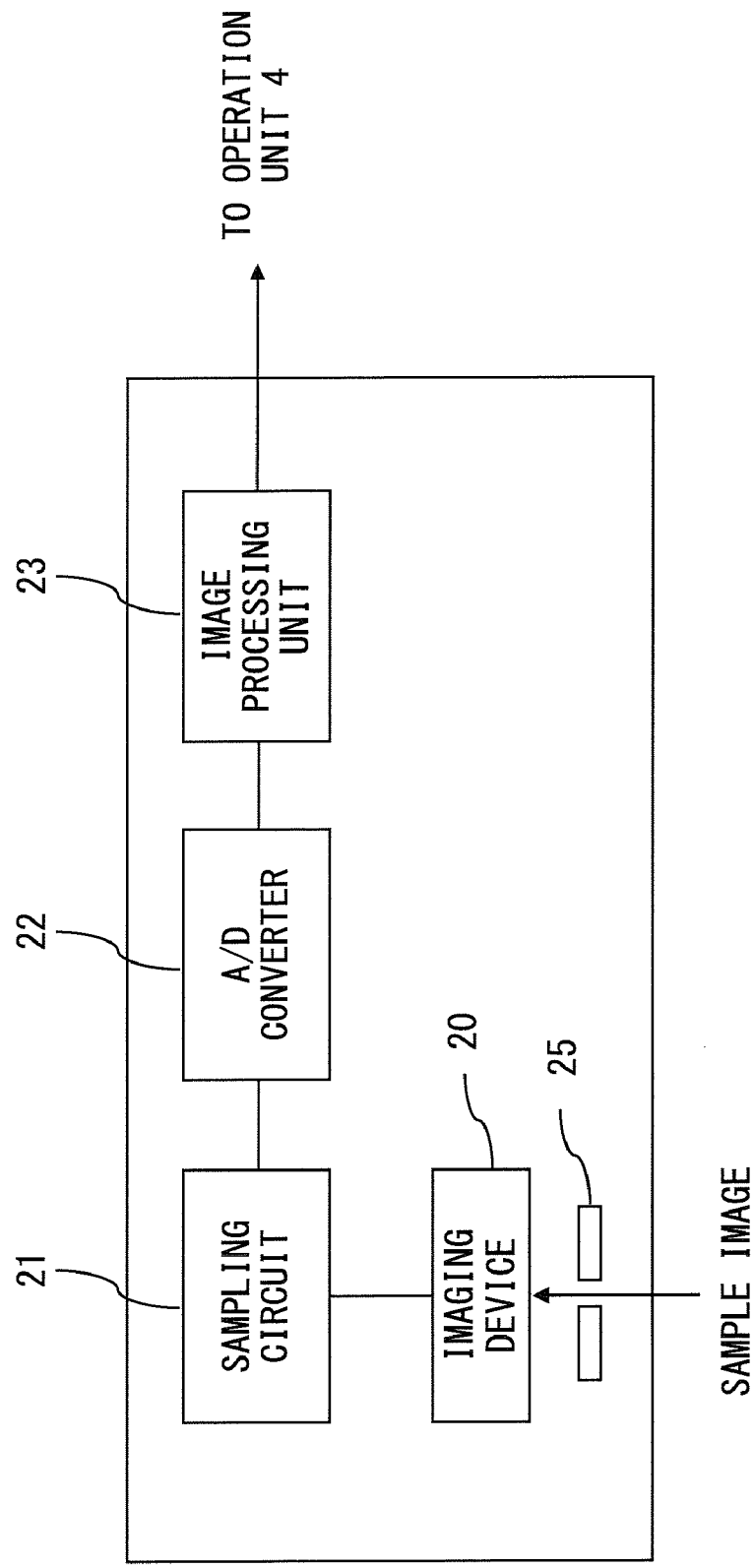
FIG. 4 illustrates the internal configuration of a camera head unit 2 in the first embodiment.

FIG. 4 illustrates the internal configuration of the camera head unit 2 in the present embodiment. The camera head unit 2 has the shutter 25, the imaging device 20, a sampling circuit 21, an A/D converter 22, and an image processing unit 23.

The imaging device 20 performs photoelectric conversion of the sample image from the microscope main body 1. The imaging device 20 is a device such as a CCD (Charge Coupled Device), for example. The sampling circuit 21 performs the sampling of an electric signal output from the imaging device 20 at certain time intervals. The A/D converter 22 converts an analog signal output from the sampling circuit 21 into a digital signal. The image processing unit 23 performs image processing for reproducing the sample image as a picture image on the basis of the converted digital signal.

The shutter 25 shuts off the sample image projected to the imaging device 20 at a desired timing. The shutter 25 may be a mechanical shutter that shuts off light mechanically, or an electric shutter that shuts off light in accordance with an electric signal.

By performing the image reproduction of the sample image successively on the basis of the configuration described above, the current sample image can be displayed on an image display panel 41 described later in real time. In other word, a live image can be displayed.

Figure 5:
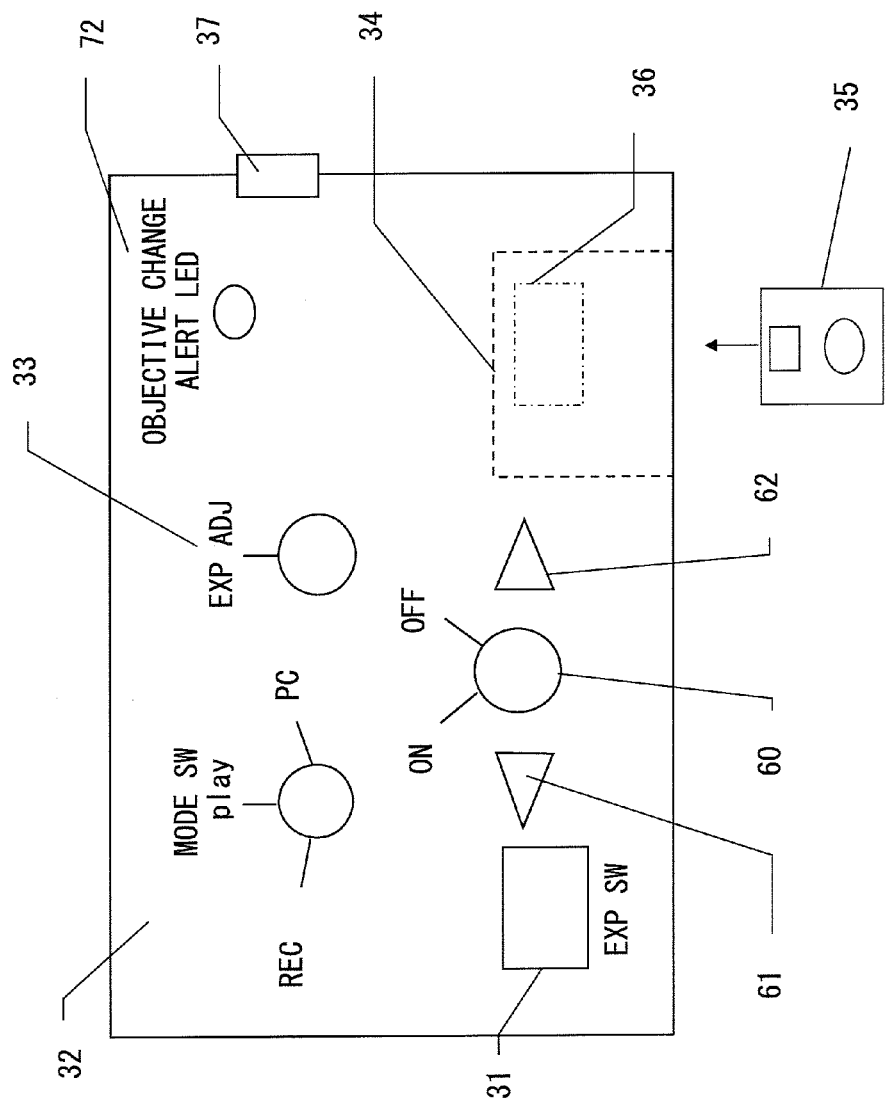
FIG. 5 illustrates the external configuration of an operation unit 4 in the first embodiment.

FIG. 5 illustrates the external configuration of the operation unit 4 in the present embodiment. The operation unit 4 has an EXPOSE SW 31, a mode SW 32, an exposure adjustment SW 33, an objective change alert LED (light-emitting diode) 72, the communication terminal 37, a recording medium read/write device 34, a power SW 60, a left selection SW 61, and a right selection SW 62.

The power SW 60 is an SW for switching ON/OFF the power of the operation unit 4. The mode SW 32 is an SW for switching the operation modes of the digital camera system for a microscope 3. The operation modes include, for example, a "shooting operation (REC) mode" for performing a shooting operation, a "play mode" for playing back shot images, a "PC mode" that enables the control by the PC 100.

The EXPOSE SW 31 is used in the case of performing imaging. The exposure adjustment SW 33 is used in the case of setting the exposure adjustment value. The objective change alert LED 72 is an LED that turns on to alert when the objective lens 52 is changed by rotating the revolver 53. The left selection SW 61 and the right selection SW 62 are for selecting left and right, respectively, when a cursor operation and the like is performed on the display unit 5.

The recording medium read/write device 34 has a reader/writer unit 36. A removable medium 35 can be put and removed into/from the recording medium read/write device 34. When the removable medium 35 is inserted into the recording medium read/write device 34, the reading out and writing in of data from/to the removable medium 35 can be performed by the reader/writer unit 36.

The communication terminal 37 is a connector for performing the access to the recording medium read/write device 34 or the remote control of various SWs provided in the operation unit 4.

In addition, the operation unit 4 has SWs (not illustrated in the drawing) for performing desired operations for the camera head unit 2 and the display unit 5. Therefore, when the observer operates those SWs, the camera head unit 2 and the display unit 5 perform predetermined operations corresponding to the SWs.

Figure 6:
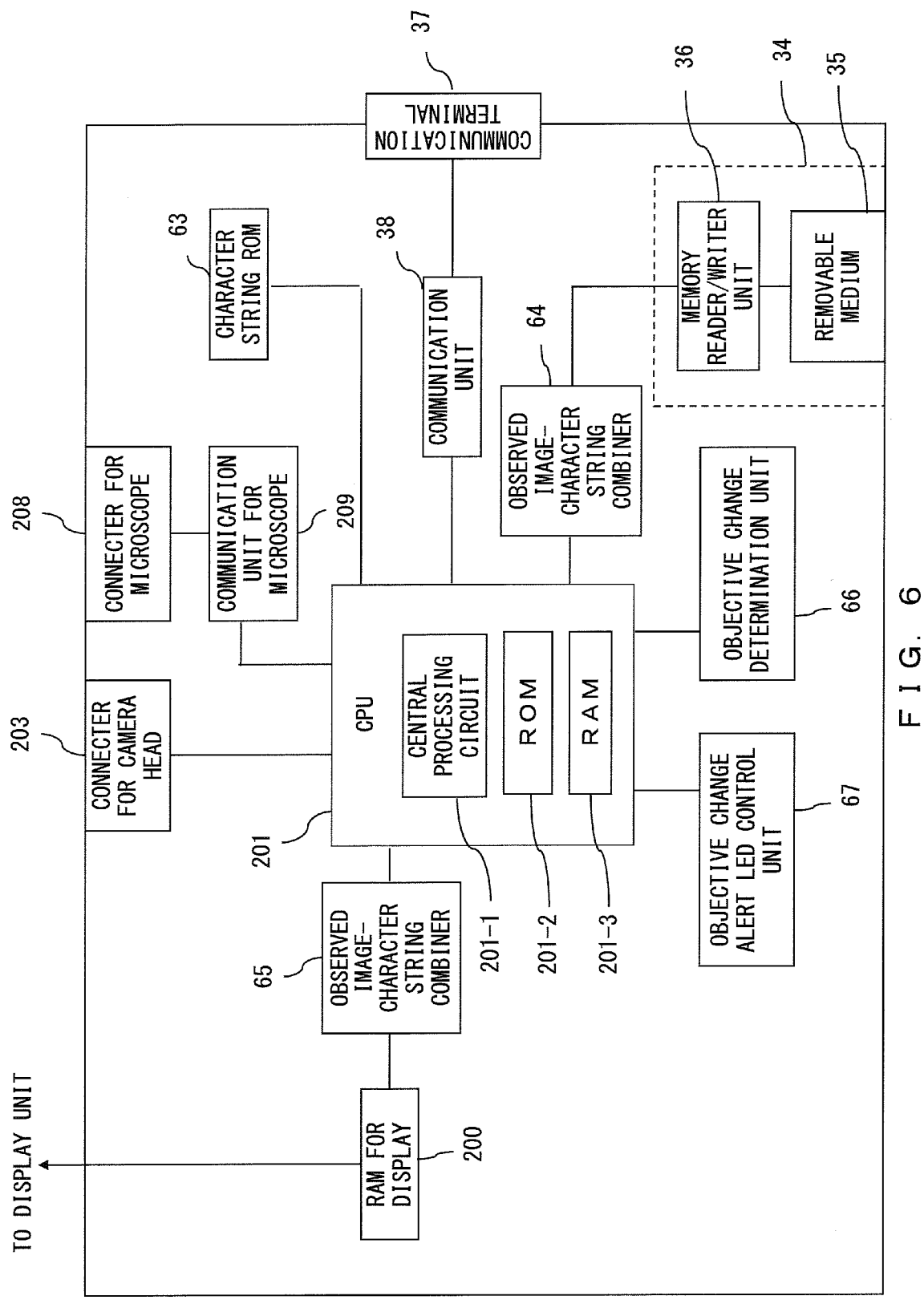
FIG. 6 illustrates the internal configuration of the operation unit 4 in the first embodiment.

FIG. 6 illustrates the internal configuration of the operation unit 4 in the present embodiment. The operation unit 4 has a RAM for display 200, observed image-character string combiners 64 and 65, a CPU 201, a communication unit 38, the communication terminal 37, and a connector for camera head 203, a connector for microscope 208, a communication unit for microscope 209, a character string ROM 63, the recording medium read/write device 34, an objective change determination unit 66, an objective change alert LED control unit 67.

The CPU 201 has a central processing circuit 201-1, a ROM (Read Only Memory) 201-2, and RAM (Random Access Memory) 201-3. The central operation circuit 201-1 controls the operations of the component devices of the operation unit 4. The ROM 201-2 stores a program for making the central processing circuit 201-1 perform various control processes described later. The RAM 201-3 is used as a work memory area for the central processing circuit 201-1 to execute the program.

The CPU 201 performs various analysis and processes in accordance with the operation of the observer. When the CPU 201 makes the display unit 5 display data and the like, the CPU 201 writes the data for display into the RAM for display 200. Meanwhile, the CPU 201 performs the control to the camera head unit 2 about imaging such as for the exposure time and the like, through the connector for camera head 203. In addition, when digital image data from the image processing unit 23 (FIG. 4) is to be recorded in the removable medium 35, the CPU 201 performs a process to convert the image data into a predetermined file format and to send it to the reader/writer unit 36. In this embodiment, as an example, the management of data files in the removable medium 35 is performed using the broadly-known FAT (File Allocation Table) file system of MS-DOS™.

The communication terminal 37 is connected to the CPU 201 via the communication unit 38. The communication between the PC 100 and the operation unit 4 is enabled by connecting an end of the communication cable 101 to the communication terminal 37 and connecting the other end to the PC 100.

The character string ROM 63 stores character-string font data such as the character, number, various symbols and the like for writing a character string into an image. The observed image-character string combiners 64 and 65 combine an imaged image and the character string.

The connector for microscope 208 is connected to the CPU 201 via the communication unit for microscope 209. The communication between the microscope main body 1 and the operation unit 4 is enabled by connecting an end of the microscope-camera connection cable 207 to the connector for microscope 208 and connecting the other end to a predetermined connector of the microscope main body 1.

The objective change determination unit 66 determines whether the objective lens in the optical path has been switched or whether the magnification has been changed, on the basis of the hole identifying information transmitted from the hole identifying information transmitter 302 (FIG. 3). The objective change alert LED control unit 67 controls the light emission of the objective change alert LED 72.

Figure 7:
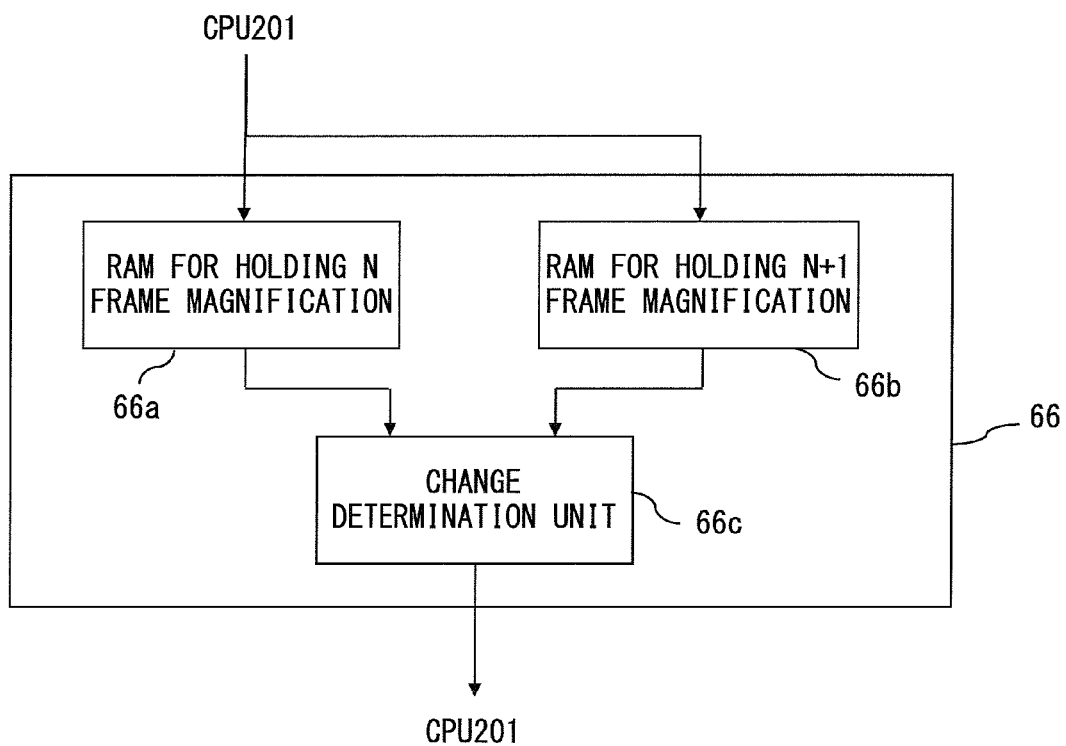
FIG. 7 illustrates the internal configuration of an objective change determination unit 66 in the first embodiment.

FIG. 7 illustrates the internal configuration of the objective change determination unit 66 in the present embodiment. The objective change determination unit 66 has a RAM for holding N frame magnification 66a, a RAM for holding N+1 frame magnification 66b, and a change determined unit 66c.

The RAM for holding N frame magnification 66a and the RAM for holding N+1 frame magnification 66b are capable of holding, respectively for one frame in turn, the hole identifying information of the hole 52 of the revolver 53 that is in the optical path of the microscope main body 1 when the live image at a given time is displayed.

The change determination unit 66c compares the hole identifying information stored in the RAM for holding N frame magnification 66a and the hole identifying information stored in the RAM for holding N+1 frame magnification 66b, to determine whether the pieces of information match each other. When the two pieces of the hole identifying information match as a result of the comparison, it means that the objective lens has not been switched, and the change determination unit 66c determines "no objective change". The change determination unit 66c transmits the determination result to the CPU 201. On the other hand, when the two pieces of the hole identifying information do not match, it means that the objective lens has been switched, and the change determination unit 66c transmits the determination result to the CPU 201.

Next, an objective change is described in detail. The objective change refers to the change of the objective lens 52 that is in the optical path of the microscope main body 1. The change of the objective lens is transmitted from the microscope main body 1 to the CPU 201 through the microscope-camera connection cable 207, and further, can be determined from the hole identifying information transmitted from the CPU 201 to the objective change determination unit 66.

As described above, six kinds of objective lens respectively having different magnifications are installed on the revolver 53. In a predetermined storage device in the operation unit 4, the magnifications of the objective lenses and the hole identifying information of the holes in which the objective lenses are installed, are stored as a table in advance, with the magnifications and the hole identifying information being related to each other.

For example, the RAM for holding N frame magnification 66a stores the hole identifying information of the hole having the objective lens of the time when the live image (which is assumed as the N frame) of a given time is displayed. The RAM for holding N+1 frame magnification 66b stores the hole identifying information of the hole having the objective lens of the time when the next frame image, that is, N+1 frame is displayed. When the hole identifying information stored in the RAM for holding N frame magnification 66a and the hole identifying information stored in the RAM for holding N+1 frame magnification 66b are different in such a case, it means that there has been a change of the objective lens.

When "no objective change" is transmitted from the objective change determination unit 66, the CPU 201 controls the objective change alert LED control unit 67 to turn off the objective change alert LED 72. Meanwhile, when "objective changed" is transmitted from the objective change determination unit 66, the CPU 201 controls the objective change alert LED control unit 67 to turn on the objective change alert LED 72.

Meanwhile, instead of the hole identifying information, the magnification of the objective lens may be compared. For example, when the CPU 201 obtains the hole identifying information transmitted from the microscope main body 1, the CPU 201 may obtain the magnification value of the objective lens corresponding to the hole identifying information from the objective magnification relation table, and transmit the magnification value to the objective change determination unit 66.

In this case, the RAM for holding N frame magnification 66a stores the magnification value of the objective lens of the time when the N frame is displayed, and the RAM for holding N+1 frame magnification 66b stores the magnification value of the objective lens of the time when the N+1 frame is displayed. In this case, the change determination unit 66c compares the magnification values stored in the RAM 66a and in the RAM 66b, and when the magnification values are different, the change determination unit 66c transmits "magnification changed" to the CPU 201.

Then, hereinafter, the hole identifying information transmitted from the CPU 201 to the objective change determination unit 66 and the magnification value of the objective lens corresponding to the hole identifying information are collectively referred to as "objective magnification information".

Figure 8:
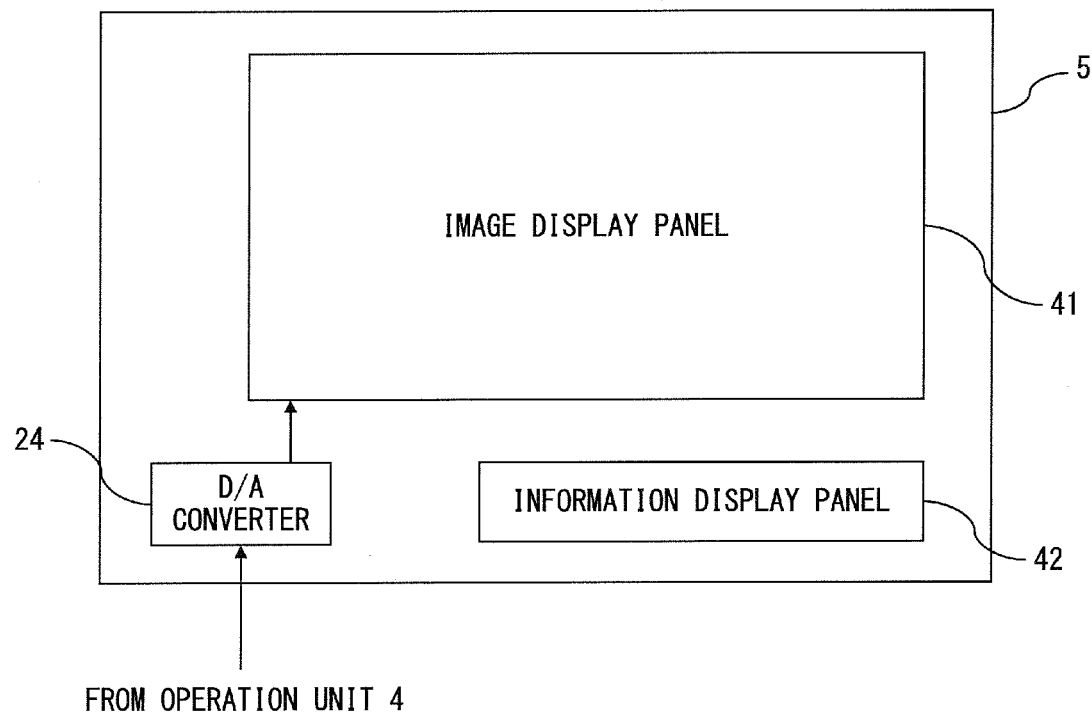
FIG. 8 illustrates the internal configuration of a display unit 5 in the first embodiment.

FIG. 8 illustrates the internal configuration of the display unit 5 in the present embodiment. The display unit 5 has the image display panel 41, an information display panel 42, a D/A converter 24. The image display panel 41 displays the reproduced image of a shot image or an image saved in a removable medium inserted in the recording medium read/write device 34. The information display panel 42 displays shooting information such as the exposure time, the exposure adjustment and the like for the shooting, and playback information of image files and the like being reproduced. The D/A converter 24 converts, into an analog signal, a digital image data signal that is required when digital image data from the RAM for display 200 is displayed.

The sample image from the microscope main body 1 moves through the imaging lens 55 and is imaged by the imaging device 20. The sample image of the sample 50 is, as described above, converted into an electric signal by the imaging device 20. The sampling circuit 21 performs spatial and temporal sampling of the electric signal. The analog signal output from the sampling circuit 21 is converted into a digital signal by the A/D converter 22. The image processing unit 23 performs predetermined image processing based on the sampling component for the converted digital signal. Then, a reproducible digital image data signal of the sample 50 is generated. The digital image data signal is transmitted through the cable 7 via the CPU 201 to the RAM for display 200, and stored in the RAM for display 200. The stored digital image data signal is delivered to the display unit 5, and converted into an analog signal by the D/A converter 24. The image data that has been converted into the analog signal is displayed on the image display panel 41.

By performing these operations successively, the playback of a moving picture (about 10-30 images are displayed and renewed in one second. One piece of image is referred to as one frame) can be performed. Then, since the moving picture can be displayed in real time, it is referred to as the live image. Meanwhile, the live image is not recorded in the removable medium 35 described later, unless the observer especially issues a recording instruction (pressing of the EXPOSE SW 31).

When an image is to be displayed on the image display panel 41, for example, either of the "shooting mode" and the "play mode" can be set by the mode SW 32. When the "shooting mode" is selected, at least two modes, namely the "live image state" and "shooting state (REC view)" can be selected for the camera head unit 2.

In the "live image state" during the "shooting mode", the camera head unit 2 can shoot the dynamic image of the sample 50 in real time, and the image can be displayed on the image display panel 41 in real time.

Meanwhile, in the "shooting state (REC view)" during the "shooting mode", with the pressing of the EXPOSE SW 31 by the observer, the shutter 25 that is for example a mechanical shutter or an electric shutter (not illustrated in the drawing) opens and closes in accordance with an appropriate exposure time. Accordingly, the camera head unit 2 can shoot the microscopic image of the sample as a still image. The shot image at this time is displayed on the image display panel 41, and information such as the shooting conditions and the like is displayed on the information display panel 42.

With the digital image data, the shot image can be recorded and saved in the removable medium 35 using the recording medium read/write device 34.

In the "shooting state (REC view)", the display of the still image on the image display panel 41 is turned off after a predetermined period of time, and the state is switched to the "live image state". The predetermined period of time is, for example, the period until the completion of the recording and saving of a shot image in the removable medium 35, or 10 seconds after the pressing of the EXPOSE SW 31 by the observer, and the like.

At this time, if the scale writing-in (in the shape of scale having numerical labels) described later has been turned "ON", a desired character string is written in at a predetermined position of on the image data. That is, with the pressing of the EXPOSE SW 31 by the observer, predetermined image processing is performed by the CPU 201 for the shot image data. After that, the observed image-character string combiner 64 writes, into the lower right position of the image in the image data, a character string selected by the observer from character-string data stored in the character string ROM 63. Then, the image data with the embedded character string is recorded in the removable medium 35 by the recording medium read/write device 34.

In addition, the selected character string is displayed on the image in the "observation state" on the image display panel 41. That is, on the observed image from the camera head unit 2, the observed image-character combiner 65 embeds the character string into the lower right position of the observed data, and after that, the image is input to the RAM for display 200. Therefore, the scale is displayed on the live image as well.

Meanwhile, if the scale writing-in (in the shape of scale having numerical labels) has been turned "OFF", the character string is not written in on the image in the "observation state" on the image display panel 41. In addition, the character string is not written on a shot image (the image shot with the scale writing-in being turned "OFF") recorded in the removable medium 35 either.

The measurement drawing is also performed in conjunction with the scale writing-in. When the scale writing-in has been turned "ON", the measurement drawing also moves through the observed image-character string combiner 64 and is embedded over the observed image, and recorded in the removable medium 35.

The scale is dependent on the total magnification of the lenses in the microscope and camera. Here, the calculation method of the scale value with the total magnification and "ON" and "OFF" of the scale writing-in (in the shape of scale having numerical labels) are explained. Assuming the total magnification as N, the scale-width rate with respect to the observation field of view as $S_{rate}$, the scale value $S_{val}$ is $$S_{val}=S_{rate}/N*n,$$

where n represents the size of the observation field of view.

Figure 9:
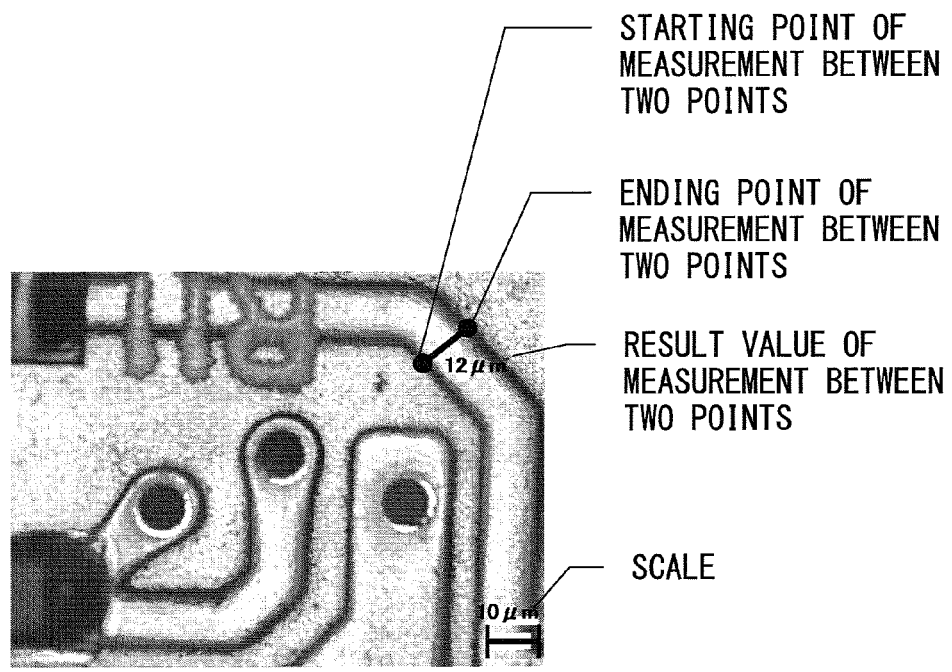
FIG. 9 illustrates an example of a live image with the display of a scale and measurement between two points in the first embodiment.

FIG. 9 illustrates an example of a live image with the display of the scale and measurement between two points in the present embodiment. The display on the bottom right of FIG. 9 is the scale display. The display on the top right of FIG. 9 is the display of measurement between two points. Here, the scale display is described.

In FIG. 9, a scale line for the amount corresponding to the scale-width rate $S_{rate}$ is written on the image, and a value indicated by $S_{val}$ is displayed. Accordingly, the length of a given observed part on the image can be measured easily. Since there is a description "10 μm" for the scale in FIG. 9, it can be understood that the length of the scale figure on the image is "10 μm".

Meanwhile, assuming the magnification of the part related to the microscope such as the magnification of the objective lens and the like (microscope-side magnification) as $N_m$, and the magnification of the part related to the camera such as the magnification of the camera lens and the like (camera-side magnification) as $N_c$, the total magnification N is $$N=N_m*N_c,$$

of which the total magnification N is input by the observer from a MENU item described later displayed on the display unit 5. On the basis of the input value, the scale and scale lines are drawn by the CPU 201.

However, generally, the microscope-side magnification $N_m$, especially the magnification of the objective lens is frequently changed by the observer to perform the microscopic observation. On the other hand, the camera-side magnification $N_c$ is a fixed value while the microscopic observation is performed. Then, by setting the camera-side magnification $N_c$ as a fixed value in the initial setting, $N_m$ is determined from the hole identifying information obtained from the microscope main body 1.

For this reason, if the total magnification N is changed due to the change of the objective lens, the total magnification N can be calculated by the CPU 201. Therefore, even when the magnification of the objective lens is changed by the rotating operation of the revolver 53, the scale display can be written with the correct total magnification N easily.

Figure 10:
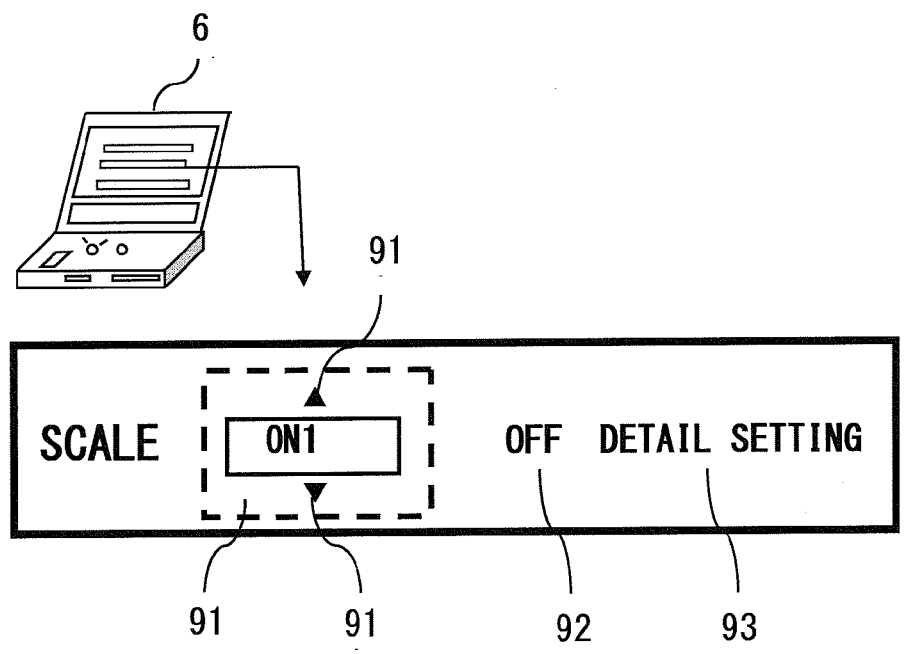
FIG. 10 illustrates MENU about the scale setting in the first embodiment.

FIG. 10 illustrates MENU about the scale setting in the present embodiment. In a scale name selection small item MENU 91, the name corresponding to the set total magnification N can be selected. Here, "ON1" is selected.

In the case of "scale OFF" in which the scale display is not to be written in, a scale OFF small item MENU 92 may be selected. When a scale detail setting small item MENU 93 is selected, a detail MENU of the scale setting illustrated in FIG. 11 is displayed.

Figure 11:
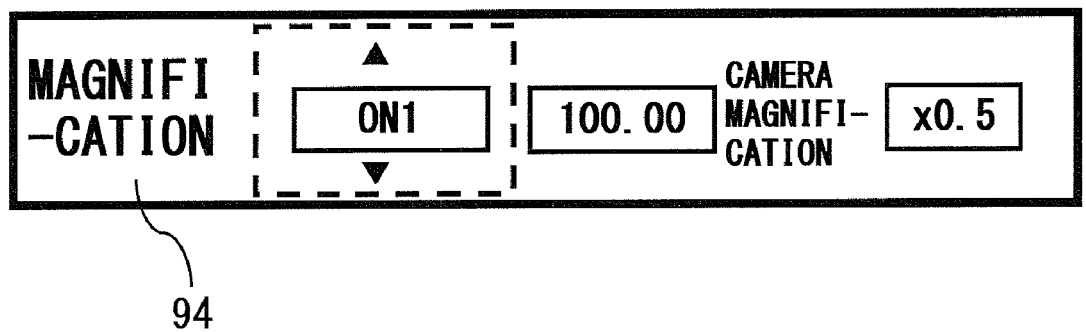
FIG. 11 illustrates the detail MENU of the scale setting in the first embodiment.

FIG. 11 illustrates the detail MENU of the scale setting in the present embodiment. In a scale magnification setting item 94, the name shown in the scale name selection small item MENU 91 and the microscope-side magnification $N_m$ corresponding to the name can be input. Here, "ON1" is set to ×100.00.

In addition, the camera-side magnification $N_c$ can be input. Here, the camera-side magnification $N_c$ is set to ×0.5. The camera-side magnification $N_c$ is, normally, the lens magnification of the adapter part (not illustrated in the drawing) connecting the microscope main body 1 and the camera head unit 2. That is, the camera-side magnification is determined at the stage when the microscope system is placed. Therefore, by setting the camera-side magnification in the initial setting, within the range of the normal use, the camera-side magnification is rarely changed (a constant value unless the magnification of the adapter is changed). Accordingly, the total magnification N can be calculated by the CPU 201 on the basis of the input value in the scale detail setting item 94.

The scale name can be selected from six kinds: ON1, ON2, ON3, ON4, ON5 and ON6. Therefore, the observer can register six kinds of total magnifications in the operation unit 4.

Meanwhile, the scale names can be selected by switching them by a scale name selection switching 91b. Specifically, at the time of the selection in the scale name selection small item MENU 91, the scale names can be switched by pressing the left selection SW 61 or the right selection SW 62. For example, when the right selection switch 61 is pressed, the scale names can be changed in the order of ON1, ON2, ON3, . . . . When the left selection SW 62 is pressed, the scale names can be changed in the order of ON1, ON2, ON3, . . . .

The observer inputs the magnification of the objective lens corresponding to the hole identifying tag 57-n for the scale name ONn (n=1-6) using the operation unit 4, while referring to the MENU in FIG. 10 and FIG. 11 displayed on the display unit 5.

The input magnification value of ONn and the camera magnification value are held until the observer resets the total magnification next, regardless of the power state. In addition, since regarding ONn (n=1-6), automatic setting can be performed by the CPU 201 on the basis of the hole identifying information transmitted from the hole identifying information transmitter 302 and the magnification information corresponding to the hole identifying information, the correct total magnification N can be calculated constantly.

In the state in which the scale can be displayed, the measurement between two points can be performed by a MENU operation that is not illustrated in the drawing. The measurement between two points is a function of displaying the distance between given two points specified by the observer with a straight line connecting the two points and the distance value. Accordingly, given two points (the starting point and the ending point) on the live image specified by the observer are connected by a straight line and displayed over the live image, and the result value for the distance between the two points is displayed. Details of the measurement process between two points are described later.

The top right of FIG. 9 has a display example of the measurement between two points. On the pattern line of the sample in the live image, the starting point and the ending point are specified. A straight line between the two points is drawn, and the result value "12 μm" is displayed.

As described above, the scale is displayed at a fixed position at the bottom right. On the other hand, for the measurement between two points, drawing is performed for the distance between any two points specified by the observer on the live screen, and the length of the straight line is shown as the measurement result value.

When the EXPOSE SW 31 is pressed in the state in which the scale and measurement between two points are displayed on the live image, as described above, the image in FIG. 9 is recorded in the removable medium 35 with the scale and the measurement result.

Meanwhile, when the "play mode" is selected with the mode SW 32 and the removable medium 35 is inserted in the recording medium read/write device 34, the shot image recorded in the removable medium 35 is read out by the reader/writer unit 36 and displayed on the image displayed panel 41. In addition, reproduced image information such as the playback file name and the like recorded in the removable medium 35 is displayed on the information display panel 42. When the left selection SW 61 or the right selection SW 62 is pressed, files that can be displayed as images on the image display panel 41 in the files recorded in the removable medium 35 are displayed sequentially.

At this time, for an image that has been shot with the scale being "ON", the image is displayed on the image display panel 41 with the character string that was written in at the time of the shooting. For example, when the live image in the state of FIG. 9 has been shot, an image including the same scale display and the measurement result as in FIG. 9 are displayed as the reproduced image.

Meanwhile, when the "PC mode" is selected with the mode SW 32, the "shooting mode" and the "play mode" can be controlled by the PC 100. Therefore, images saved in the removable medium 35 inserted in the recording medium read/write device 34 can be saved in a hard disk drive on the PC 100 side. In addition, images in the recording medium read/write device 34 can be displayed on the screen of the PC 100. In addition, contents displayed on the display unit 5 can be displayed on the screen of the PC 100.

At this time, when the images saved in the removable medium 35 is displayed on the PC 100, for an image that has been shot with the scale being "ON", the image is displayed with the character string that was written in at the time of the shooting.

Figure 12:
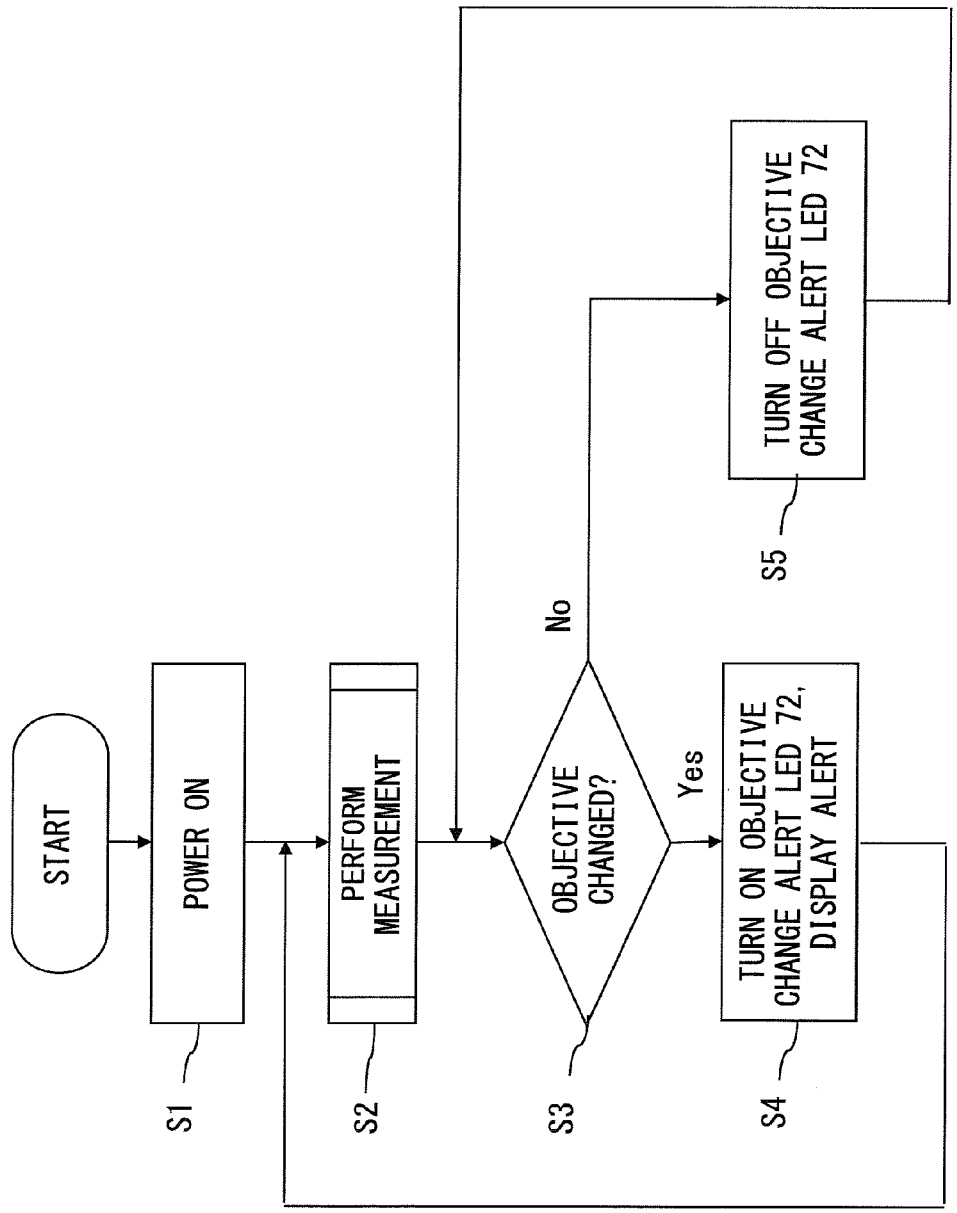
FIG. 12 illustrates the operation flow of the entire digital camera system for a microscope 3 in the first embodiment.

FIG. 12 illustrates the operation flow of the entire digital camera system for a microscope 3 in the present embodiment. The power SW 71 of the microscope main body 1 and the digital camera system for a microscope 3 is turned ON to turn on the power (S1). Then, the digital camera system for a microscope 3 enters the operating state, and the observer performs the measurement between two points (S2). The process of S2 is described later.

After that, the objective change determination unit 66 determines whether or not the objective lens has been changed, on the basis of the objective magnification information sent from the CPU 201, and transmits the determination result to the CPU 201. When the transmitted determination result is "no objective change" ("No" in S3), the CPU 201 makes the objective change alert LED control unit 67 turn off the objective change alert LED 72. If the objective change alert LED 72 is on, the objective change alert LED control unit 67 turns off the objective change alert LED (S5).

On the other hand, when the transmitted determination result is "objective changed" ("Yes" in S3), the CPU 201 makes the objective change alert LED control unit 67 turn on the objective change alert LED 72. If the objective change alert LED 72 is off, the objective change alert LED control unit 67 turns on the objective change alert LED (S4). Furthermore, the CPU 201 makes a message "the measurement result is incorrect due to objective change" displayed on the screen as an alert.

Figure 14:
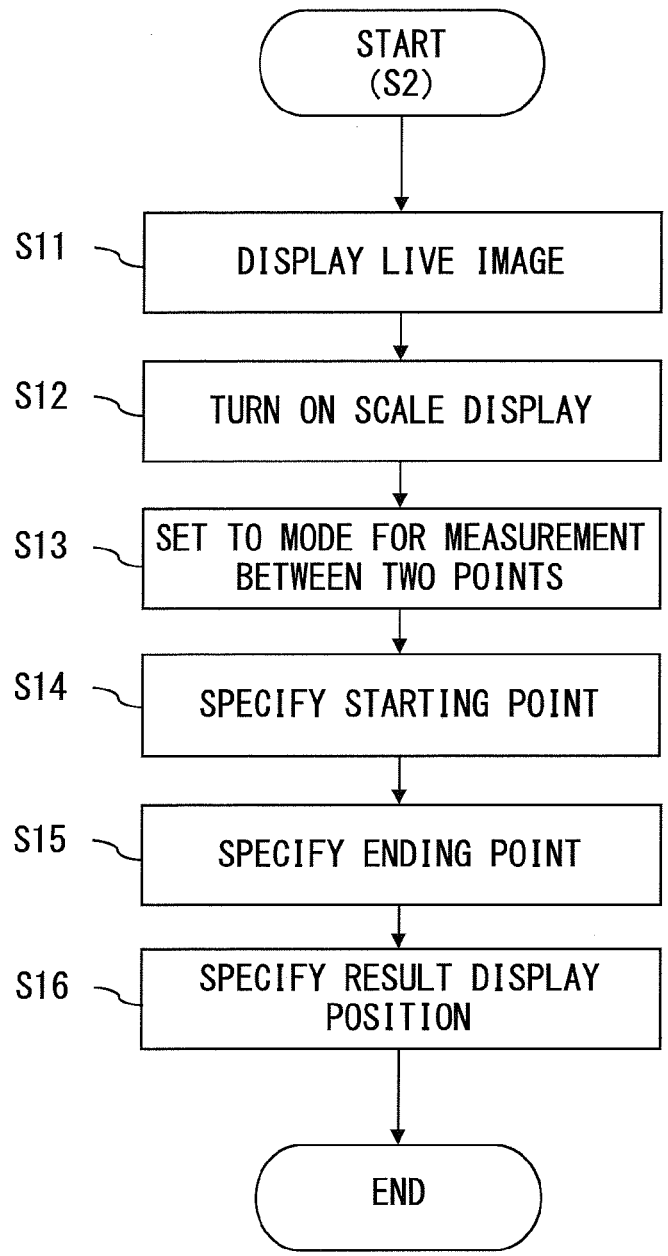
FIG. 14 illustrates the operation flow of measurement between two points in the first embodiment.

FIG. 14 illustrates the operation flow of measurement between two points in the present embodiment. The mode SW 32 is operated to display the live image (S11). Then, the scale display is turned ON (S12). Meanwhile, as described in FIG. 10 and FIG. 11, the initial setting (input setting of the $N_m$ and $N_c$ values) is performed in advance. After that, by a MENU operation that is not illustrated in the drawing, setting to a mode for measurement between two points is performed (S13).

In the state of the mode for measurement between two points, measurement between two points specified by the observer can be performed. The observer first specifies the starting point for the part of which distance is to be measured, by the operation of the left selection SW 61 and the like (S14). For specifying the starting point, for example, a general method is to display a pointer (cursor) on the live screen, move the pointer to a desired position for measurement and confirm it. The ending point is specified in a similar way (S15).

After that, the observer specifies the position on which the result value of the straight-line distance between the starting point and the ending point is to be displayed (S16). The display position of the result value is generally in the vicinity of the measurement between two points, but it may be at any position.

Then, the CPU 201 draws a straight line that connects the starting point and the ending point, and places it over the live image. The CPU 201 also calculates the straight-line distance, and makes the calculation result value displayed at the specified position on the live image.

Figure 13:
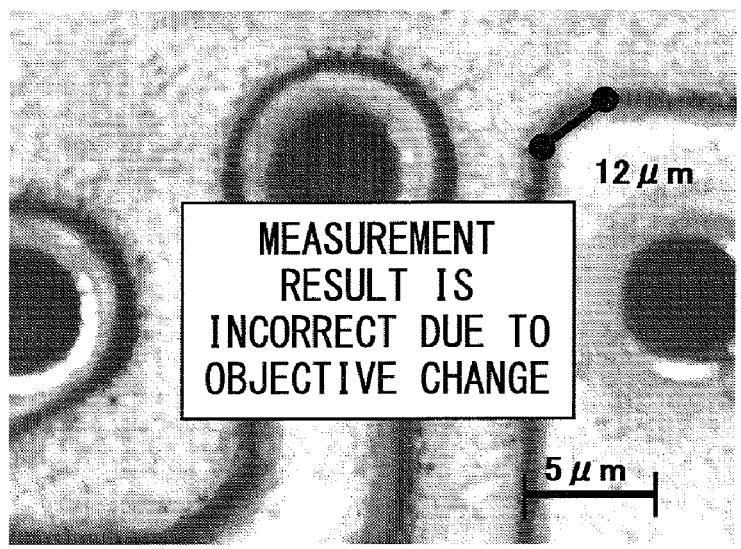
FIG. 13 illustrates an alert display in the first embodiment.

Meanwhile, if the magnification of the objective lens is changed (it is assumed here that the magnification is changed to a larger one) by switching the objective lenses after the measurement between two points is performed on the live image, the state of the live image is changed from the image in FIG. 9 to the image in FIG. 13. Here, the live image in FIG. 13 is in a state in which the center part of FIG. 9 is enlarged.

However, in FIG. 13, the measurement result is not in the correct state since it still remains in the state of FIG. 9.

For the scale display, the CPU 201 performs recalculation, on the basis of the magnification information, and the optimal value for the magnification of the objective lens after the change is displayed. Therefore, the scale display in FIG. 9 is "10 μm", whereas the scale display in FIG. 13 is "5 μm". In addition, the length of the straight line of the scale is different in FIG. 9 and FIG. 13. This is because the live image is generated by capturing the observation light from the microscope main body 1 and converting it into the image in the imaging device 20, whereas the drawing of the distance measurement is generated by the CPU 201, and the live image and the drawing are combined in the observed image-character string combiner 65.

In the present embodiment, when the magnification of the objective lens is changed in the state in which the drawing for the measurement between two points has been done, an alert that the measurement result displayed on the screen is the one in the state before the magnification change can be issued, to notify that the display of the measurement between two points for the currently-displayed image is incorrect. Therefore, after changing the objective lens of the microscope main body 1, the observer can recognize that the measurement result is incorrect, or change the objective lens back to the one with which the measurement was performed.

Variation Example 1

In the above description, the objective change determination 66 determines whether the objective lens has been changed, on the basis of the objective magnification information corresponding to the two live images (images of an N frame and an N+1 frame) respectively. On the other hand, in this variation example, whether the objective lens has been changed is determined by comparing the objective magnification information at the time when the measurement started and the objective magnification information of the objective lens used for displaying the current frame.

Figure 15:
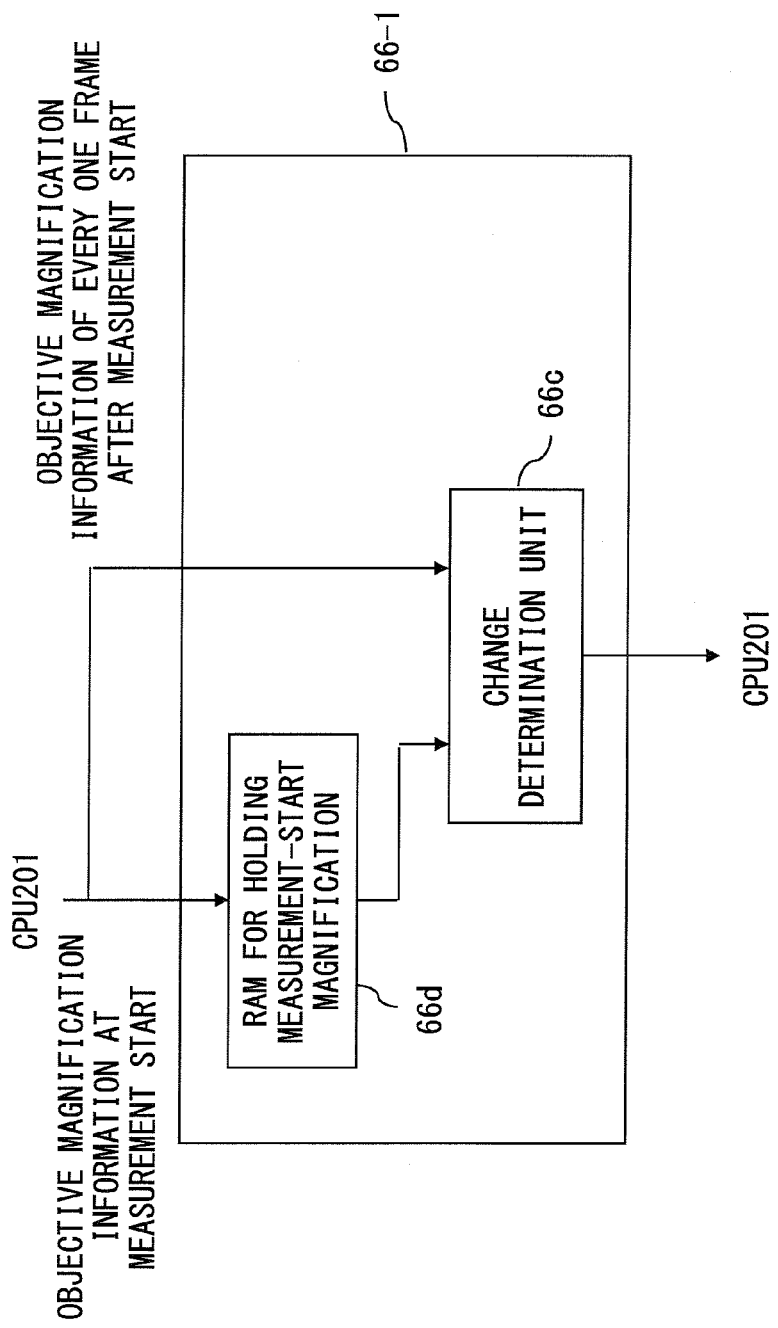
FIG. 15 illustrates the internal configuration of an objective change determination unit 66-1 in the first embodiment (variation example 1).

FIG. 15 illustrates the internal configuration of an objective change determination unit 66-1 in the present embodiment (variation example 1). In FIG. 15, the objective change determination unit 66-1 has a RAM for holding measurement-start magnification 66d and a change determination unit 66c.

The objective change determination unit 66-1 obtains objective magnification information at the time when the measurement starts, and stores it in the RAM for holding measurement-start magnification 66d. After that, the objective change determination unit 66-1 obtains objective magnification information for every one frame.

The change determination unit 66c compares the objective magnification information at the measurement start and each piece of the objective magnification information obtained afterwards. When the compared two pieces of objective magnification information match, the change determination unit 66c determines "no objective change". Meanwhile, when the compared two pieces of objective magnification information do not match, the change determination unit 66c determines "objective changed".

For example, when the objective lens is changed by rotating the revolver 53 from the state in FIG. 9, the change determination unit 66c determines "objective changed". Then, the alert in FIG. 13 is displayed, and the objective change alert LED 72 is turned on. After that, when the revolver 53 is rotated again to return the objective lens to the objective lens at the time when the measurement was performed in FIG. 9, the state returns to the one observed with the same magnification as the magnification held in the RAM for holding measurement-start magnification 66d. As a result, the change determination unit 66c determines "no objective change". Then, the display of the alert in FIG. 13 disappears, and the objective change alert LED 72 is turned off. Thus, the return to the state in FIG. 9 can be performed.

Variation Example 2

In the first embodiment described above, the RAM for holding N frame magnification 66a and the RAM for holding N+1 frame magnification 66b are used for holding objective magnification information corresponding to two live images (images of an N frame and an N+1 frame) respectively. In contrast, this variation example describes a case in which those RAMs are replaced by registers of the CPU.

Figure 16:
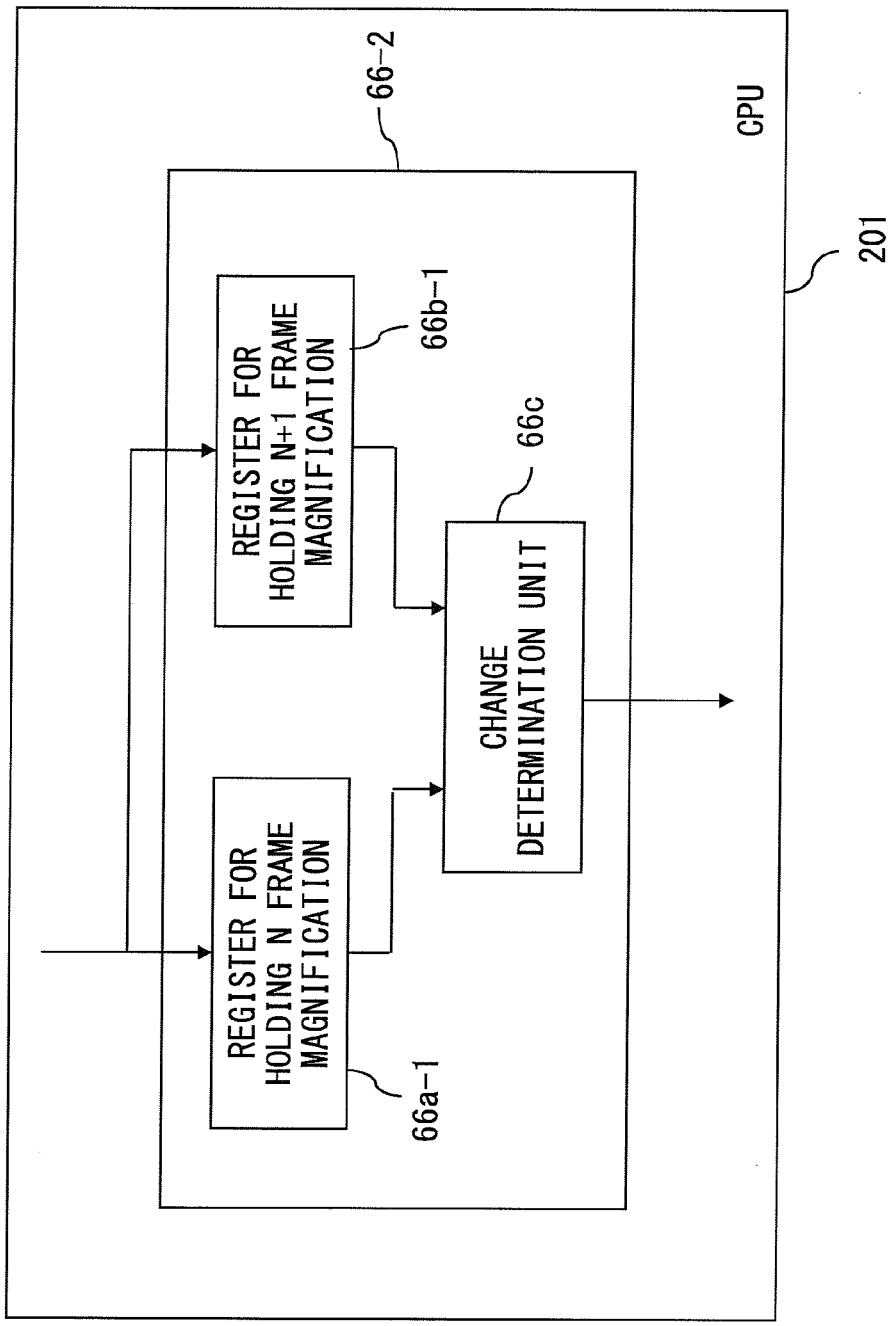
FIG. 16 illustrates the internal configuration of an objective change determination unit 66-2 in the first embodiment (variation example 2).

FIG. 16 illustrates the internal configuration of the objective change determination unit 66-2 in the present embodiment (variation example 2). In FIG. 15, the objective change determination unit 66-2 is included in the CPU 201, and has a register for holding N frame magnification 66a-1, a register for holding N+1 frame magnification 66b-1 and a change determination unit 66c.

In FIG. 16, the RAM for holding N frame magnification 66a in FIG. 7 is replaced by the register for holding N frame magnification 66a-1, and the RAM for holding N+1 frame magnification 66b is replaced by the register for holding N+1 frame magnification 66b-1. The other configurations are the same as in the embodiment described above.

The operations of the objective change determination 66-2 are the same as in the present embodiment described above. That is, the objective magnification information of the N frame is held in the register for holding N frame magnification 66a-1, and the objective magnification information of the N+1 frame is held in the register for holding N+1 frame magnification 66b-1. The change determination unit 66c performs the determination of "no objective change" and "objective changed" in the similar way as in the first embodiment by comparing register values held in the registers 66a-1 and 66b-a.

According to the present embodiment, when the observation magnification is changed, an alert that the measurement result for an image after the magnification change is incorrect can be issued. Accordingly, the operability is improved.

Second Embodiment

In this embodiment, when the magnification of the objective lens is changed from a low magnification to a high magnification, whether or not a measurement target that existed within the field of view with the low magnification also exists in the field of view with the high magnification is determined, and if the target does not exist within the field of view, an alert is issued to tell it. In addition, when the magnification of the objective lens is changed from a high magnification to a low magnification, whether it is impossible with the low magnification to measure a measurement target that was measured with the high magnification (because the magnification target becomes smaller) is determined, and when it cannot be measured (when it becomes smaller than the minimum measurement resolution), an alert is issued to tell it. Meanwhile, in this embodiment, the same numerals are given to the same configurations and processes as in the first embodiment, and their description is omitted.

FIG. 17 illustrates examples of the observation field of view at an n-times magnification and the observation field of view at an m-times magnification, where n<m. When the objective magnification is changed from n-times to m-times, the area enclosed by the broken line at the center of the observation field of view with the n-times magnification is enlarged.

Figure 18:
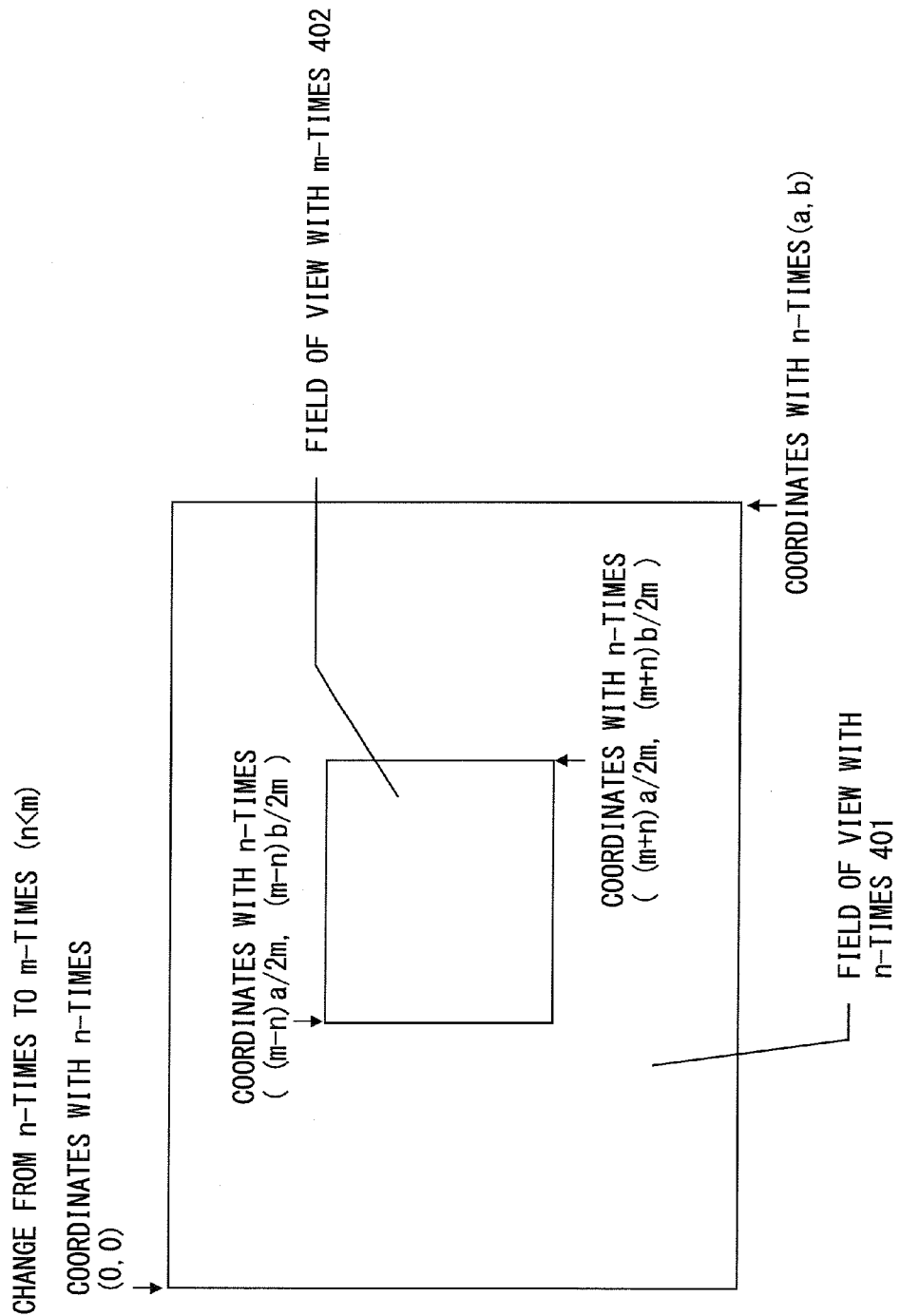
FIG. 18 illustrates coordinates corresponding to the observation field of view with the n-times magnification and the observation field of view with the m-times magnification in the second embodiment.

FIG. 18 illustrates coordinates corresponding to the observation fields of view with the n-times magnification and the m-times magnification. The coordinates with the n-times magnification are assumed as (0, 0) to (a, b). That is, the number of pixels of the observed image is assumed as a*b [pixels]. Here, when the magnification is changed from n-times to m-times, the area ((m−n)a/2m, (m−n)b/2m) to ((m+n)a/2m, (m+n)b/2m) in the field of view with the n-times magnification becomes a field of view area 402 with the m-times magnification, as the observation area 402 with the m-times magnification is the area from the center of a field of view 401 with the n-times magnification enlarged by n/m(a, b) times.

Therefore, when the magnification is changed from n-times to m-times, a measurement target within the area ((m−n)a/2m, (m−n)b/2m) to ((m+n)a/2m, (m+n)b/2m) in the field of view with the n-times magnification can be observed and measured also with the m-times magnification (while being expanded by m-times). However, a measurement target outside that area cannot be observed nor can be measured as it does not exist within the observation field of view with the m-times magnification.

Next, when the magnification is changed from m-times to n-times, the observation field of view expands from ((m−n)a/2m, (m−n)b/2m) to ((m+n)a/2m, (m+n)b/2m), to (0, 0) to (a, b). Therefore, an observation target with the m-times magnification is always included in the observation field of view with the n-times magnification.

Meanwhile, assuming the minimum resolution (minimum resolution with which measurement between two points can be performed) for measurement with the m-times magnification as k [pixels], the minimum resolution for the n-times magnification is (n/m*k). However, because n<m, the measurement cannot be performed with the n-times magnification, unless the minimum resolution with the m-times magnification is α*k that realizes the relationships of $(n/m)*\alpha*k \leq k$ [pixels]

$\alpha \leq m/n$ (because it becomes smaller than the minimum resolution with the n-times magnification). For this reason, the minimum measurement resolution for the m-times magnification with which the measurement can be performed both with the m-times magnification with the n-times magnification is (m/n)k (decimals are truncated). Therefore, when the minimal measurement value with the m-times magnification is smaller than (m/n)k, the measurement cannot be performed with the n-times magnification.

Figure 19:
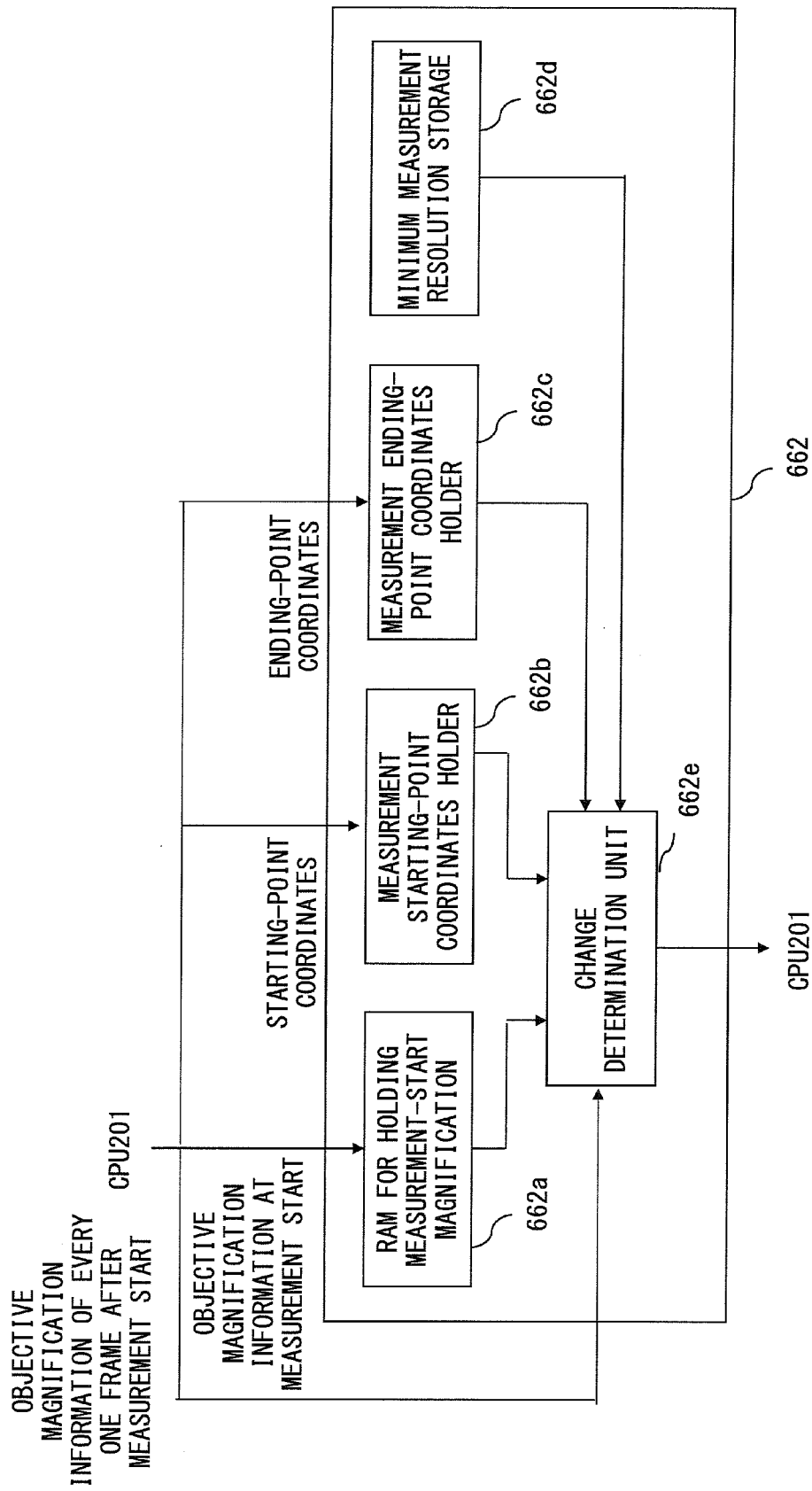
FIG. 19 illustrates the internal configuration of an objective change determination unit 662 in the second embodiment.

FIG. 19 illustrates the internal configuration of an objective change determination unit 662 in the present embodiment. The objective change determination unit 662 has a RAM for holding measurement-start magnification 662a, a measurement starting-point coordinates holder 662b, a measurement ending-point coordinates holder 662c, a minimum measurement resolution storage 662d, and a change determination unit 662e.

The RAM for holding measurement-start magnification 662a corresponds to the RAM for holding measurement-start magnification 66d in the first embodiment. Therefore, the RAM for holding measurement-start magnification 662a holds objective magnification information at the time when measurement starts, that is, objective magnification information (hole identifying information or a magnification value) that corresponds to the n-times magnification.

The measurement starting-point coordinates holder 662b can hold the starting-point coordinates of measurement between two points. For example, the measurement starting-point coordinates holder 662b can hold coordinates ($A_s$, $B_s$) with the n-times magnification, where $A_s$<a and $B_x$<b.

The measurement ending-point coordinates holder 662c can hold the ending-point coordinates of measurement between two points. For example, the measurement ending-point coordinates holder 662c can hold coordinates ($A_e$, $B_e$) with the n-times magnification, where $A_e$<a and $B_e$<b.

The change determination unit 662e compares, in the same way as in the first embodiment (variation example 1), the objective magnification information at the measurement start held in the RAM for holding measurement-start magnification 662a and each piece of the objective magnification information obtained afterwards. When the compared two pieces of objective magnification information match, the change determination unit 662e determines "no objective change". Meanwhile, when the compared two pieces of objective magnification information do not match, the change determination unit 662e determines "objective changed".

When "objective changed" is determined as, for example, the magnification is changed from n-times to m-times, the change determination unit 662e determines whether or not the coordinates held in the measurement starting-point coordinates holder 662b and in the measurement ending-point coordinates holder 662c respectively satisfy the following condition (equation (1)). When they do not satisfy the following condition (equation (1)), it is regarded as an error as the measurement cannot be performed.

**start of equation (1)

$$((m-n)a/2m, (m-n)b/2m) < (A_s, B_s) < ((m+n)a/2m, (m+n)b/2m) \text{ and}$$

$$((m-n)a/2m, (m-n)b/2m) < (A_e, B_e) < ((m+n)a/2m, (m+n)b/2m)$$

**end of equation (1)
where, when the magnification is changed from n-times to m-times, (n<m).

The minimum measurement resolution storage 662d can hold a minimum measurement resolution k [pixels]. For example, when the magnification is changed from m-times to n-times (n<m), the minimum measurement resolution stored in the minimum measurement resolution storage 662d is k [pixels]. At this time, the change determination unit 662e determines whether the minimum measurement value with the m-times magnification is smaller than (m/n)k, and notifies the CPU 201 of whether it is impossible to perform the measurement.

Specifically, the change determination unit 662e determines whether or not the coordinates held in the measurement starting-point coordinates holder 662b and in the measurement ending-point coordinates holder 662c respectively satisfy the following condition (equation (2)). When they do not satisfy the following condition (equation (2)), it is regarded as an error as the measurement cannot be performed.

**start of equation (2)

$$\{(A_s-A_e)^2+(B_s-B_e)^2\}^{1/2} \geq (m/n)k$$

**end of equation (2)
where, when the magnification is changed from n-times to m-times, (n<m).

Figure 20:
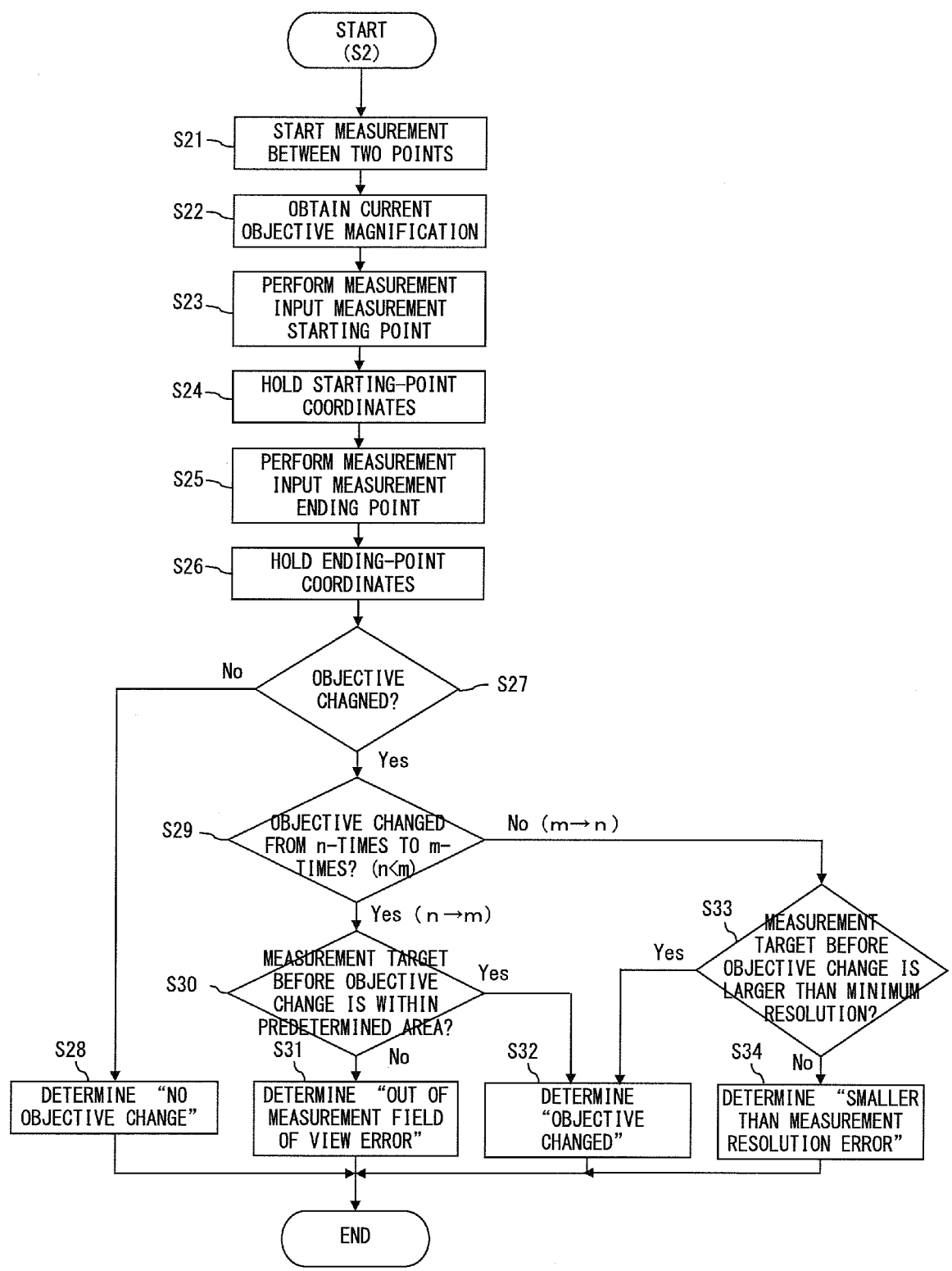
FIG. 20 illustrates the determination process flow of the objective change determination unit 662 in the second embodiment.

FIG. 20 illustrates the determination process flow of the objective change determination unit 662 in the present embodiment. When measurement between two point starts (S21), the objective change determination unit 662 obtains the objective magnification information at that time, and stores it in the RAM for holding measurement-start magnification 662a (S22).

When the observer inputs the starting-point position of the measurement between two points (S23), the starting-point coordinates ($A_s$, $B_s$) are stored in the measurement staring-point coordinates holder 662b (S24). After that, when the observer inputs the ending-point position of the measurement between two points in the same manner (S25), the ending-point coordinates ($A_e$, $B_e$) are stored in the measurement ending-point coordinates holder 662c (S26).

The change determination unit 662e determines, in the same manner as in the variation example 1 of the first embodiment, whether the objective magnification has been changed (S27). When there has been no change in the objective magnification, the change determination unit 662e determines "no objective change" ("No" in S27), and notifies the CPU 201 of the determination (S28).

When the change determination unit 662e determines that there has been a change in the objective magnification ("Yes" in S27), it checks whether the objective magnification has been changed from n-times to m-times (S29), where n<m.

When the objective magnification has been changed from n-times to n-times ("Yes" in S29), the change determination unit 662e determines whether the condition in the equation (1) mentioned above is satisfied (S30). When the equation (1) is satisfied ("Yes" in S30), the measurement target stays within the observation field of view even when the magnification is changed from n-times to m-times. In this case, the change determination unit 662e determines "objective changed", and notifies the CPU 201 of the determination (S32).

On the other hand, when the equation (1) is not satisfied ("No" in S30), the change from n-times to m-times results in the measurement target with the n-times magnification being out of the area of the observation field of with the m-times magnification, becoming unable to be observed nor measured. In this case, the change determination unit 662e determines an "out of measurement field of view error", and notifies the CPU 201 of the determination (S31).

In S29, if the change is from m-times to n-times ("No" in S29), the change determination unit 662e determines whether or the condition in the equation (2) mentioned above is satisfied (S33). When the equation (2) is satisfied ("Yes" in S33), even if the magnification is changed from m-times to n-times, the measurement target can be measured again in the observation with the n-times magnification. In this case, the change determination unit 662e determines "objective changed", and notifies the CPU 201 of the determination (S32).

On the other hand, when the equation (2) is not satisfied ("No" in S33), the change from m-times to n-times results in a situation where the measurement target with the m-times magnification cannot be measured in the observation with the n-times magnification as it becomes smaller than the minimum measurement resolution. In this case, the change determination unit 662e determines a "smaller than measurement resolution error", and notifies the CPU 201 of the determination (S34).

When the CPU 201 is notified of "objective changed", "out of observation field of view error" and "smaller than measurement resolution error" ("Yes" in S3 in FIG. 12), the CPU 201 performs the process of S4 in FIG. 12. On the other hand, when the CPU 201 is notified of "no objective change" ("No" in S3 in FIG. 12), the CPU 201 performs the process of S5 in FIG. 12.

Thus, using the objective change determination unit 662, the "out of measurement field of view error" and "smaller than measurement resolution error" can be determined in addition to "objective changed" and "no objective change" in the first embodiment. By performing display on the screen in accordance with these determination details, the appropriate measurement state can be reported to the observer.

According to the digital camera system for a microscope 3 of the present embodiment, in addition to the effects of the first embodiment, when the observation magnification is changed, further, an alert that the measurement target before the magnification change does not exist within the screen, and an alert that the measured place before the change cannot be measured with the magnification after the change are issued. Therefore, the operability with the measurement is improved further.

Third Embodiment

This embodiment describes a case in which, in the second embodiment, the drawing of the measurement is changed in accordance with the objective magnification change. That is, when the objective magnification is changed after the measurement is performed in the first embodiment or in the second embodiment, the observation target object (the live-displayed image) expands or contracts (in accordance with the expansion or contract of the objective magnification). However, the drawing of the measurement is unchanged. Therefore, in this embodiment, in accordance with the expansion and contract of the observation target object, the measurement drawing also expands or contracts with the same magnification. Meanwhile, in this embodiment, the same numerals are given to the same configurations and processes as in the first embodiment or the second embodiment, and their description is omitted.

Figure 21:
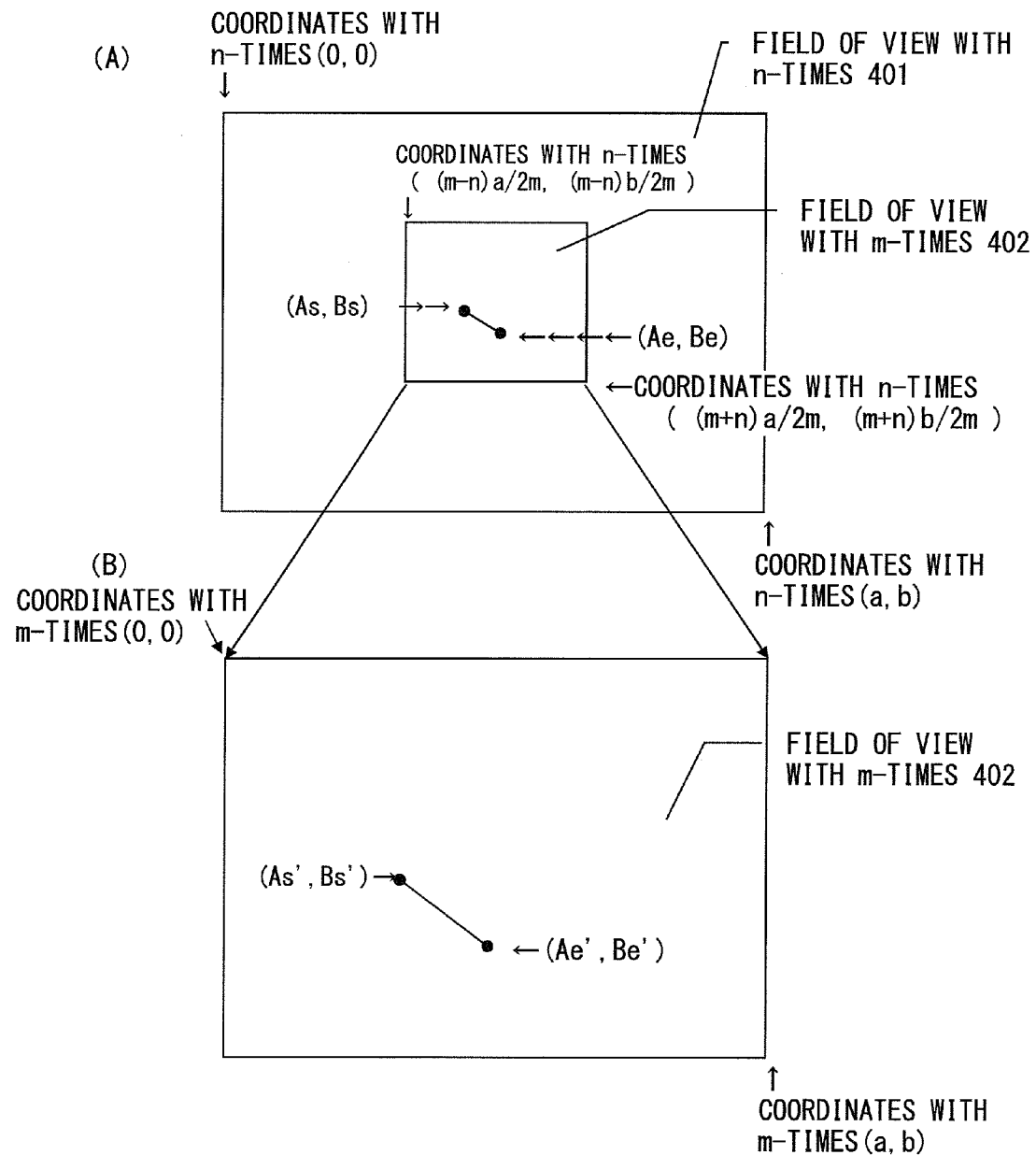
FIG. 21 illustrates the relation of coordinates in a case in which a part of the observation field of view with an n-times magnification is displayed while enlarging it by m-times in the third embodiment.

FIG. 21 illustrates the relation of coordinates in a case in which a part of the observation field of view with an n-times magnification is displayed while enlarging it by m-times in the present embodiment. In the same manner as in the second embodiment, when measurement between two points is performed by the objective change determination unit 662, the starting-point coordinates ($A_s$, $B_s$) and the ending-point coordinates ($A_e$, $B_e$) are held in the measurement starting-point coordinates holder 662b and the measurement ending-point coordinates holder 662c, respectively.

Assuming that the objective magnification is changed from n-times to m-times, the relative positional relationship of the observation target and the measurement drawing needs to be maintained. Assuming the starting-point coordinates in the measurement between two points with the m-times magnification as ($A_s'$, $B_s'$) and the ending-point coordinates as ($A_e'$, $B_e'$), in order to maintain the relative positional relationship of the observation target and the measurement drawing, the following condition (equation (3)) needs to be satisfied. However, being different from FIG. 18, the starting-point coordinates with the m-times magnification are assumed as (0, 0), and the ending-point coordinates are assumed as (a, b).

**start of equation (3)

$$A_s'=\{A_s-((m-n)a/2m)\}m/n$$

$$B_s'=\{B_s-((m-n)b/2m)\}m/n$$

$$A_e'=\{A_e-((m-n)a/2m)\}m/n$$

$$B_e'=\{B_e-((m-n)b/2m)\}m/n$$

**end of equation (3)

Therefore, when the drawing is performed between the two points ($A_s'$, $B_s'$) and ($A_e'$, $B_e'$) in accordance with the above equation, it becomes the measurement drawing on the observation screen with the m-times magnification.

Figure 22:
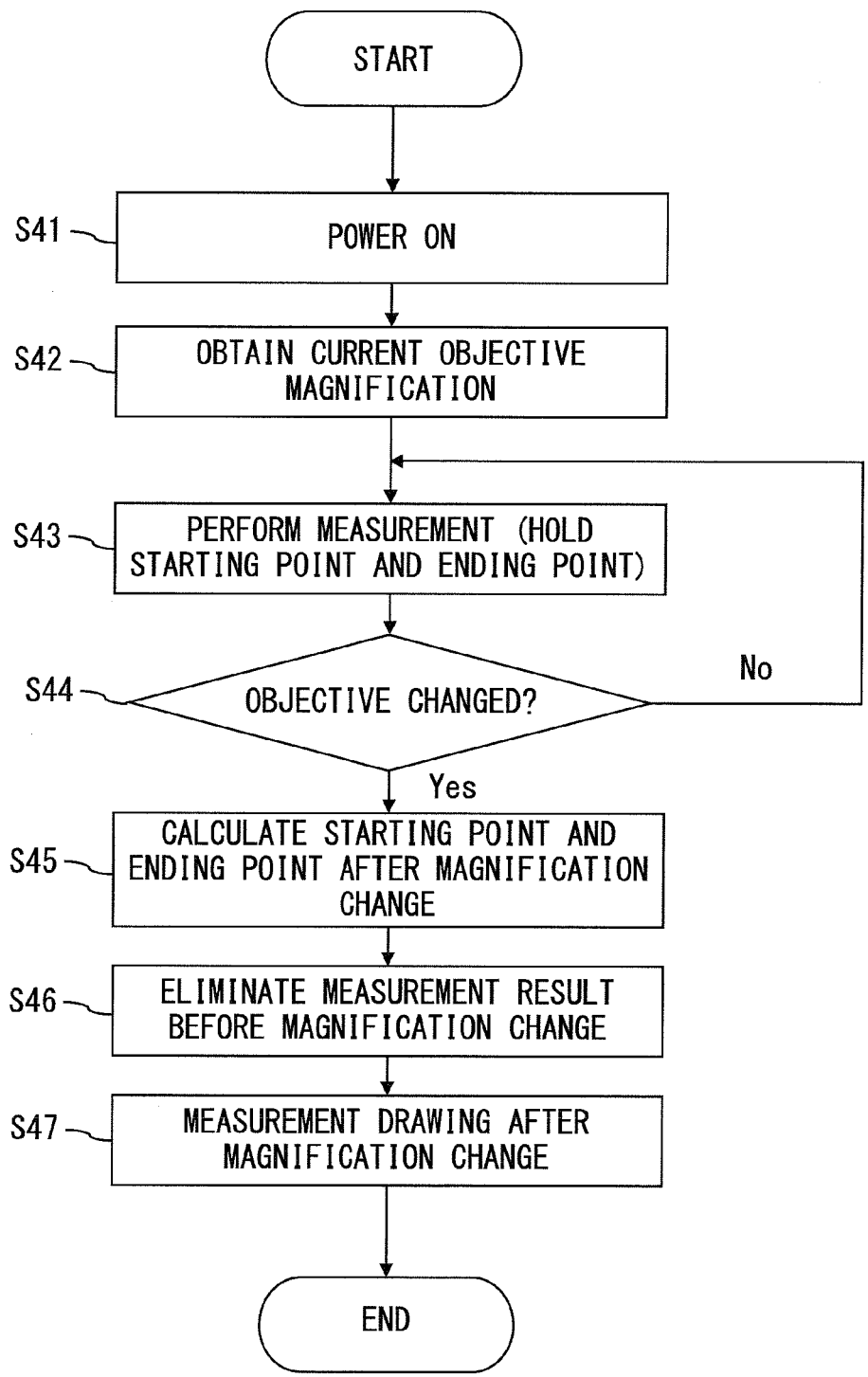
FIG. 22 illustrates the process flow of changing the drawing of measurement between two points in accordance with the objective magnification change in the third embodiment.

FIG. 22 illustrates the process flow of changing the drawing of measurement between two points in accordance with the objective magnification change in the present embodiment. First, when the power of the digital camera system for a microscope 3 is turned ON (S41), the CPU 201 obtains the current objective magnification information (S41). Then, measurement between two points is performed (S42). In the process of the measurement between two points, in the same manner as in the second embodiment, appropriate values are stored in the RAM for holding measurement-start magnification 662a, measurement starting-point coordinates holder 662b, and the measurement ending-point coordinates holder 662c, in the objective change determination unit 662.

After the measurement between two points is performed, the objective change determination unit 662 determines, in the same manner as in the second embodiment, whether there has been a change in the objective magnification (S44). When there has been no change in the objective magnification, new measurement is performed ("No" in S44).

When there has been a change in the objective magnification ("Yes" in S44), the objective change determination unit 662 notifies the CPU 201 of it. When the CPU 201 is notified of the change in the objective magnification, the CPU 201 calculates stating-point coordinates and ending-point coordinates that correspond to the measurement target after the magnification change, according to the equation (3) mentioned above (S45).

After that, the CPU 201 deletes the measurement between two points drawn before the objective change from the screen (S46). Then, a straight line connecting two points is drawn in accordance with new starting-point coordinates ($A_s'$, $B_s'$) and ending-point coordinates ($A_e'$, $B_e'$) (S47). At this time, the recalculation of the measurement result value is also performed.

Meanwhile, in the same manner as in the second embodiment, when the measurement target does not exist in the observation field of view after the magnification change or when it becomes smaller than the minimum measurement resolution, the objective change determination unit 662 notifies the CPU 201 of such an error.

According to the digital camera system for microscope 3 of the third embodiment, in addition to the effects of the first and second embodiments, when the observation magnification is changed, further, the measurement drawing before the magnification change can be redrawn in accordance with the magnification after the change. Therefore, there is no need to perform the measurement again after the observation magnification is changed, and the measurement operability is improved.

Fourth Embodiment

This embodiment describes a digital camera system for a microscope with which, in the third embodiment, the fine adjustment of the position of the measurement redrawn after the change of the objective magnification can be performed. Meanwhile, in this embodiment, the same numerals are given to the same configurations and processes as in the first through third embodiments, and their description is omitted.

For example, when the respective objective lenses are eccentric, the center (a/2, b/2) of the observation field of view of the n-times magnification objective lens and the center (a'/2, b'/2) of the observation field of view of the m-times magnification objective lens do not match completely.

FIG. 23A and FIG. 23B illustrate a case in which, after measurement between two points with the n-times magnification is performed in the present embodiment, the objective magnification is changed to m-times. In the measurement with the n-times magnification, the measurement between the two points corresponding to the diameter of a circle in the live image is performed, and a straight line connecting the two points is drawn (FIG. 23A). However, with the m-times magnification, the drawn straight line is out of the circle part of the observed image (FIG. 23B). The measurement drawing with the m-times magnification is the one drawn automatically in the same manner as in the third embodiment. Therefore, the misalignment is corrected in the present embodiment.

Figure 24:
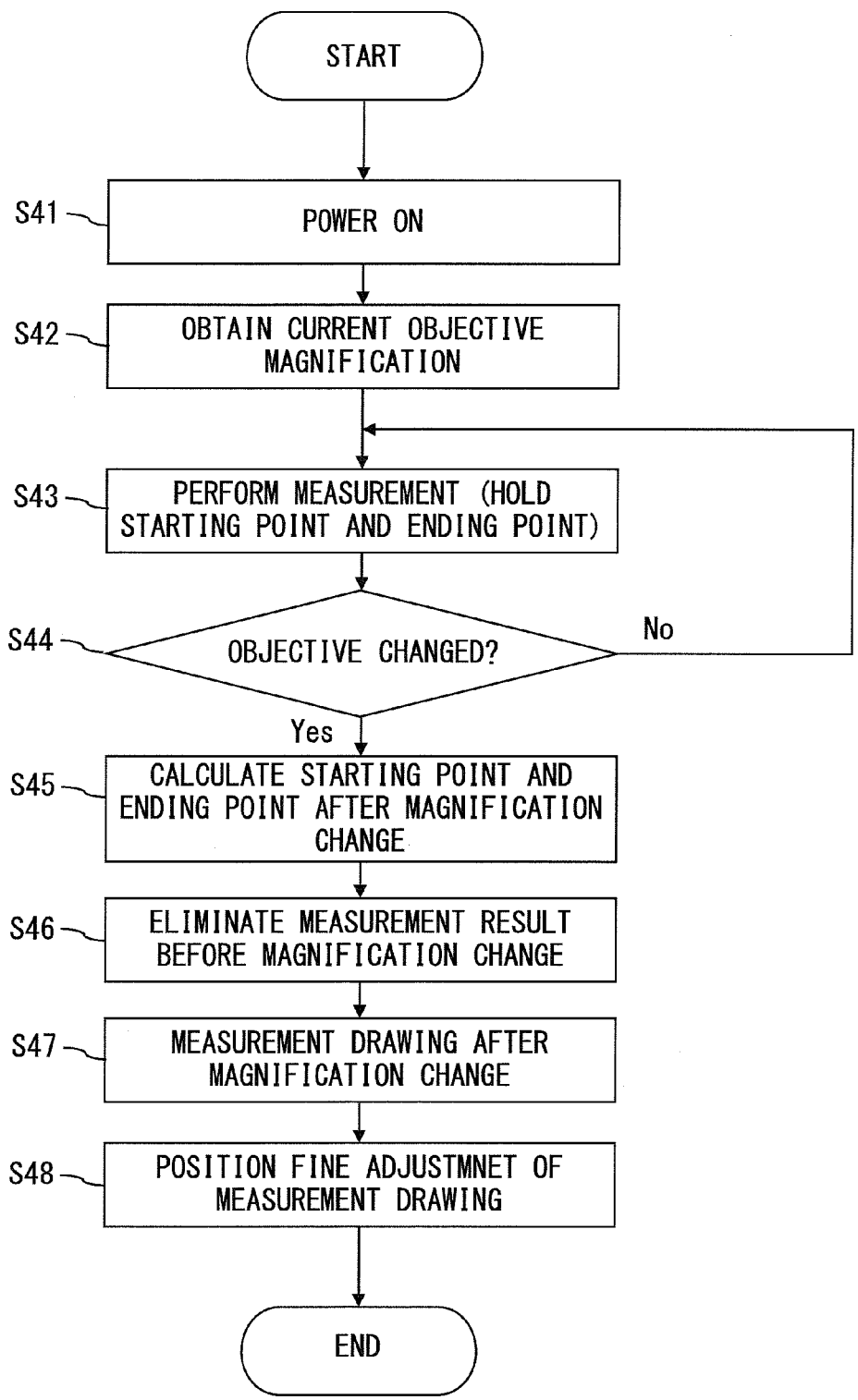
FIG. 24 illustrates the flow of the fine adjustment of the misaligned drawing position after the change of the drawing of measurement between two points in accordance with the objective magnification change in the fourth embodiment.

FIG. 24 illustrates the flow of the fine adjustment of the misaligned drawing position misaligned after the change of the drawing of measurement between two points in accordance with the objective magnification change in the present embodiment. In FIG. 24, a process of fine-adjusting the drawing position to bring it to the same position as with the n-times magnification (S48) is added after the processes in FIG. 22.

Following the measurement drawing between two points after the magnification change in S47, the fine adjustment of the position of the drawing of the measurement result can be performed using the left selection SW 61, the right selection SW 62, an up selection SW (not illustrated in the drawing)

and a down selection SW (not illustrated in the drawing) (S48). This is explained using FIG. 25.

FIG. 25 is a diagram explaining the fine adjustment of the misaligned drawing position misaligned after the change of the drawing of measurement between two points in accordance with the objective magnification change in the present embodiment. After the process of FIG. 47, for example, when the left selection SW 61 is pressed once, the straight-line drawing between two points moves to the left by 1 [pixel] Therefore, by operating the respective selection SWs for left and right, up and down, the measurement drawing illustrated with the broken line in FIG. 25 can be moved to the position of the solid line. Here, the drawing of the part illustrated with the broken line represents the drawing after the process of S47, and the drawing illustrated with the solid line represents the drawing after the completion of the fine adjustment.

According to the digital camera system for a microscope 3 of the present embodiment, in addition to the effects of the first through third embodiments, further, the fine adjustment of misalignment between the observed image and the measurement drawing due to an eccentricity error with the observation magnification change can be performed. Therefore, the operability of measurement between two points is further improved.

In addition, not only the fine adjustment of the position of the drawing of a straight line between two points but also the adjustment of its length may be performed. This is explained using FIG. 26.

Figure 26:
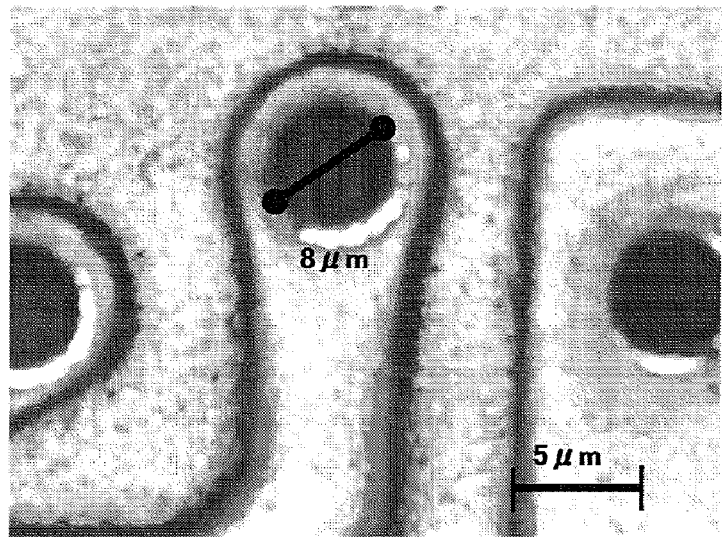
FIG. 26 is a diagram explaining the fine adjustment of the length of the drawing part between two points illustrated by a solid line in FIG. 25

FIG. 26 is a diagram explaining the fine adjustment of the length of the drawing part between two points illustrated by the solid line in FIG. 25. From the drawing between two points display state illustrated with the solid line in FIG. 25, the fine adjustment of the straight-line drawing can be performed by operations such as the operation of the respective selection SWs for up and down, left and right. For example, when the right selection SW 62 is pressed once, the straight-line drawing between two points becomes longer by 1 [pixel]. When the left selection SW 61 is pressed once, the straight-line drawing between two points becomes shorter by 1 [pixel]. Meanwhile, in conjunction with the change of the length, the measurement result may also be changed.

In FIG. 25, while the diameter of the circle part is measured, the straight-line drawing is long in relation to the circle part. Then, by performing the fine adjustment of the drawing, the length can be matched to the diameter of the circle part as illustrated in FIG. 26. In this case, since the straight line is shortened, while the measurement result is "12 µm" in FIG. 25, it is "8 µm" in FIG. 26.

When the expansion to m-times is performed (n<m) after the observation and measurement between two points are performed with the n-times magnification, a slight misalignment in the measurement with the n-times magnification may be highly noticeable. However, according to the present embodiment, such a slight misalignment can be fine-adjusted, enabling more accurate measurement. That is, by performing not only the fine adjustment of the position in FIG. 25 but also the fine adjustment of the length in FIG. 26, more accurate measurement can be performed.

Variation Example

A variation example of the fourth embodiment is described. This variation example describes realizing, in the fourth embodiment, the automatic position fine adjustment of the measurement drawing with the objective magnification change while maintaining the eccentric state of the respective objective lenses.

Figure 27:
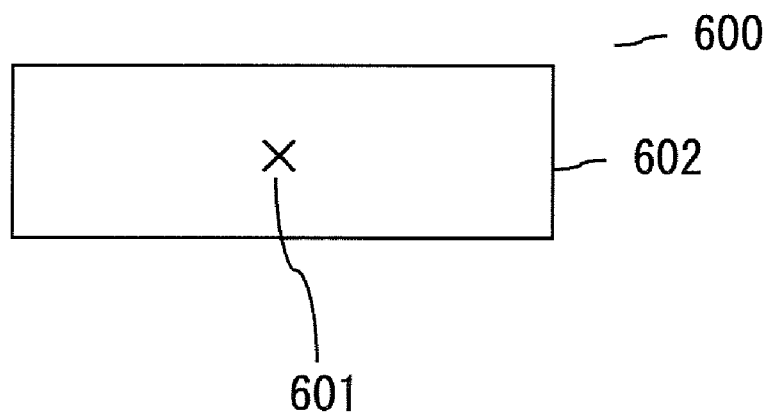
FIG. 27 illustrates an example of a slide glass sample for adjustment in the fourth embodiment (variation example).

FIG. 27 illustrates an example of a slide glass sample for adjustment in the present embodiment (variation example). As illustrated in FIG. 27, as the slide glass sample for adjustment 600, a cross line (X mark) 601 is placed at the center of a slide glass 602.

Figure 28:
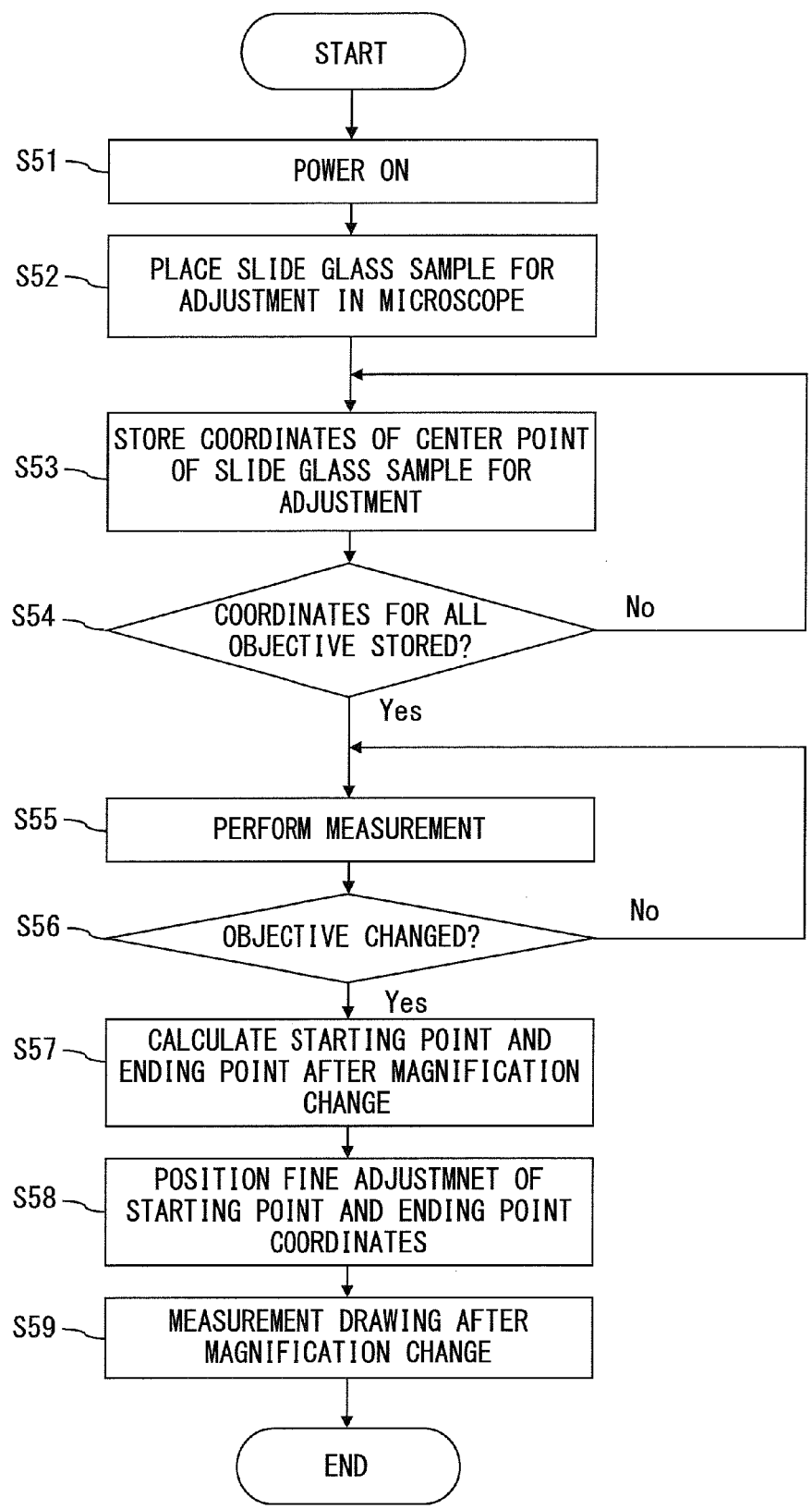
FIG. 28 illustrates a flow of performing the automatic position fine adjustment of the measurement drawing with the objective magnification change while maintaining the eccentric state of the respective objective lenses in the fourth embodiment (variation example).

FIG. 28 illustrates a flow of performing the automatic position fine adjustment of the measurement drawing with the objective magnification change while maintaining the eccentric state of the respective objective lenses in the present embodiment (variation example). First, after turning the power of the digital camera system for a microscope 3 ON (S51), the slide glass sample for adjustment 600 is set in the microscope main body 1 (S52).

With all of the six objective lenses set on the revolver 53, the slide glass sample for adjustment 600 is observed, and the coordinates of the cross line 601 on the slide glass 602 are stored in the ROM 201-2 or the RAM 201-3 in the CPU 201 in the operation unit 4 (S53, S54).

Specifically, when the slide glass sample for adjustment 600 is observed through an objective lens, the cross line 601 can be observed around the center of the field of view. The slide glass sample 600 is fixed so as not to move in this state. That is, the stage 51 on which the sample 50 is placed is not moved.

In this state, by operations that are not illustrated in the drawing such as the operation of up, down, left and right selection SWs of the operation unit 4, the CPU 201 reads out the coordinates of the center part of the cross line 601, and stores them in the ROM 201-2 or the RAM 201-3 (S53). In the same manner, each objective lens set on the revolver 53 is inserted into the observation optical path, and the coordinates of the center part of the cross line 601 for each observation field of view observed through each objective lens are stored in the ROM 201-2 or the RAM 201-3.

After measurement between two points is performed (S55), in the same manner as in the embodiment described above, whether or not there has been a change in the objective magnification is determined by the objective change determination unit 662 (S56). When there has been no change in the objective magnification, new measurement is performed ("No" in S56).

When there has been a change in the objective magnification ("Yes" in S56), the objective change determination unit 662 notifies the CPU 201 of it. When the CPU 201 is notified of the change in the objective magnification, the CPU 201 calculates the starting-point coordinates and the ending-point coordinates after the magnification change (S57). The CPU 201 performs the fine adjustment of the starting point and the ending point (S58). After that, a straight line connecting the fine-adjusted starting point and ending point is drawn (S59). The processes of S57-S59 are explained using FIG. 29.

Figure 29:
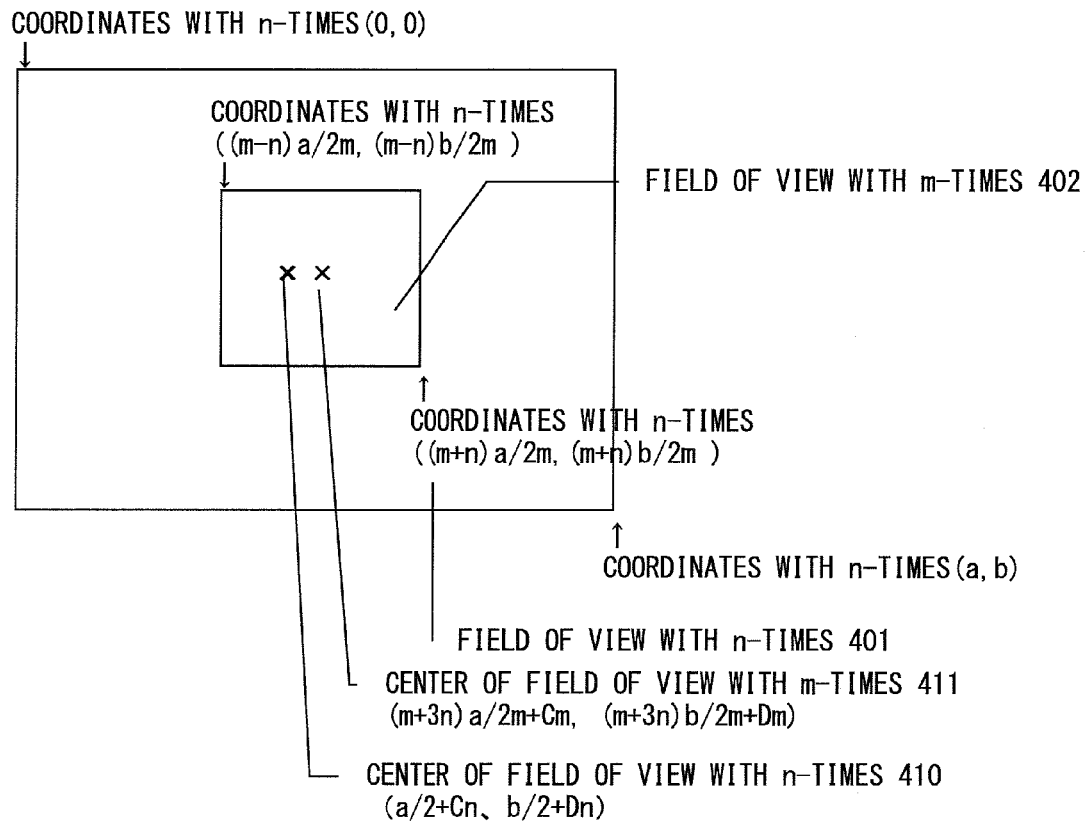
FIG. 29 illustrates cross line center part coordinates in the case in which the observation is performed with the n-times magnification objective lens and the m-times magnification objective lens in the fourth embodiment (variation example).

FIG. 29 illustrates the cross-line center part coordinates in the case in which the observation is performed with the n-times magnification objective lens and the m-times magnification objective lens in the present embodiment (variation example). A numeral 401 represents the field of view with the n-times magnification. A numeral 402 represents the field of view with the m-times magnification. A numeral 410 represents the center of the field of view with the n-times magnification. A numeral 411 represents the center of the field of view with the m-times magnification.

In FIG. 29, the cross line in the case of observation with the n-times magnification objective lens and the cross line in the case of observation with the m-times magnification objective lens are slightly out of the center of the observation field of view. The misaligned amount from the center is $(C_n, D_n)$ with the n-times magnification and is $(C_m, D_m)$ with the m-times magnification.

Under this situation, the CPU 201 performs measurement between two points with the n-times magnification (S55), and calculates the starting point and the ending point in the case the change to m-times is performed (S57). Assuming the starting-points coordinates with the n-times magnification as $(A_s, B_s)$ and the ending-point coordinates $(A_e, B_e)$, the starting-point coordinates with the m-times magnification $(A_{sm}, B_{sm})$ and the ending-point coordinates $(A_{em}, B_{em})$ are expressed by an equation (4).

**start of equation (4)

$$A_{sm} = -C_m + \{(A_s + C_n) - ((m-n)a/2m)\} m/n$$

$$B_{sm} = -D_m + \{(B_s + D_n) - ((m-n)b/2m)\} m/n$$

$$A_{em} = -C_m + \{(A_e + C_n) - ((m-n)a/2m)\} m/n$$

$$B_{em} = -D_m + \{(B_e + D_n) - ((m-n)b/2m)\} m/n$$

**end of equation (4)

By calculating the starting-point coordinates $(A_{sm}, B_{sm})$ and the ending-point coordinates $(A_{em}, B_{em})$ using the equation (4), the CPU 201 performs the fine adjustment the starting point position and the ending point position with the eccentricity of the objective lens (S58). After that, the CPU 201 draws a straight line connecting the starting point and the ending point of which positions have been fine-adjusted (S59).

According to this variation example, the eccentric state of each objective lens is stored in the initial setting, and the misalignment of the positions of the starting point and the ending point due to the eccentricity of the objective lenses can be automatically fine-adjusted in the measurement drawing with the magnification change. Therefore, in addition to the effect of the fourth embodiment, since the fine adjustment of the position does not need to be performed by the observer, the operability is improved further.

Fifth Embodiment

In the third embodiment, the measurement drawing is redrawn in accordance with the change of the objective magnification. In contrast, in this embodiment, the measurement redrawing is performed following the move of the observed image made by the operation of the stage 51. Meanwhile, in this embodiment, the same numerals are given to the same configurations and processes as in the first through fourth embodiments, and their description is omitted.

Figure 30:
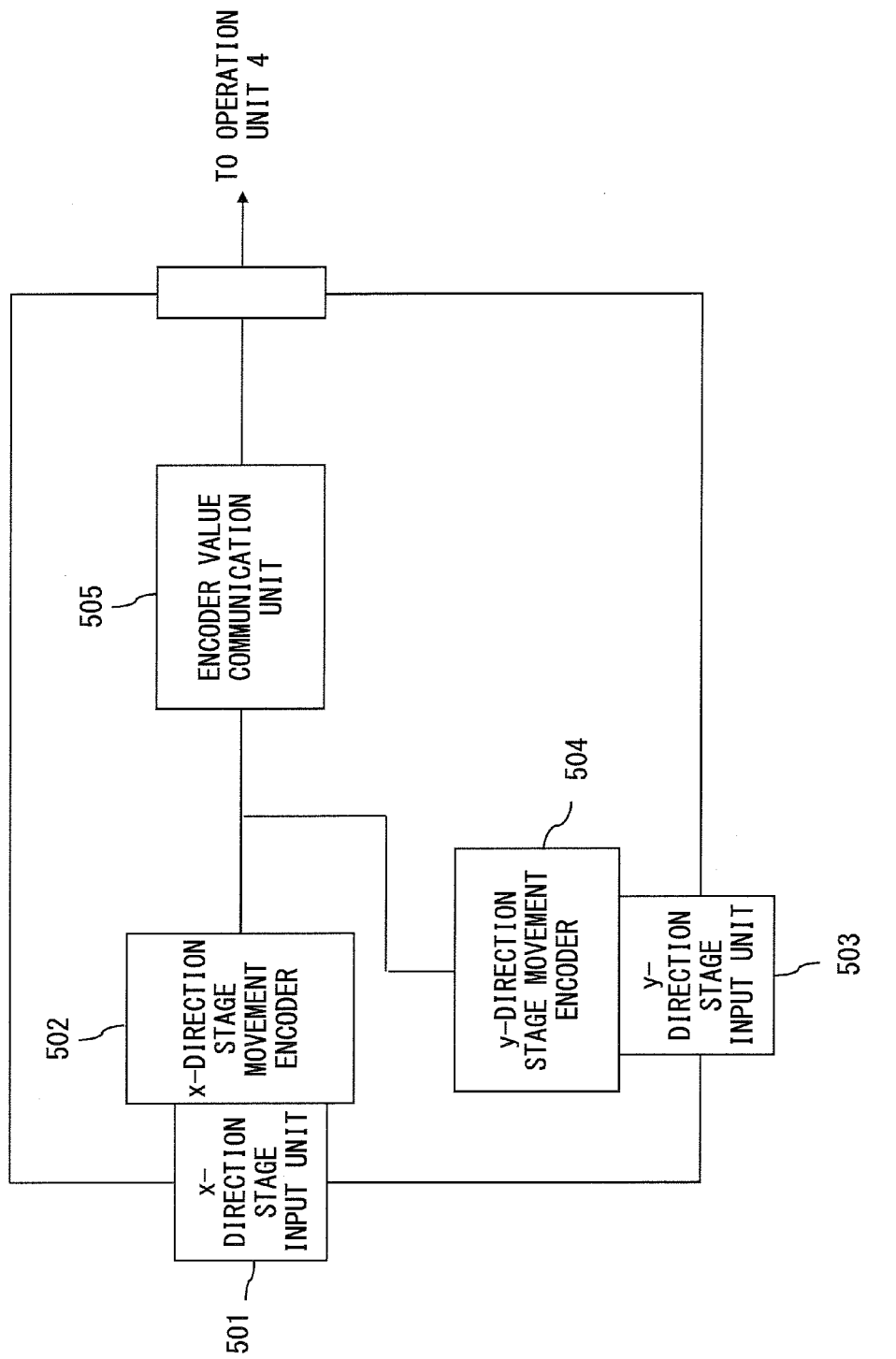
FIG. 30 illustrates the internal configuration of a stage 51 in the fifth embodiment.

FIG. 30 illustrates the internal configuration of the stage 51 in the present embodiment. The stage 51 has an X-direction stage input unit 501, an X-direction stage movement encoder 502, a Y-direction stage input unit 503, a Y-direction stage movement encoder 504, and an encoder value communication unit 505.

When the observer operates the X-direction stage input unit 501 and the Y-direction stage input unit 503, the observation field of view moves in the X direction and Y direction, respectively.

Figure 31:
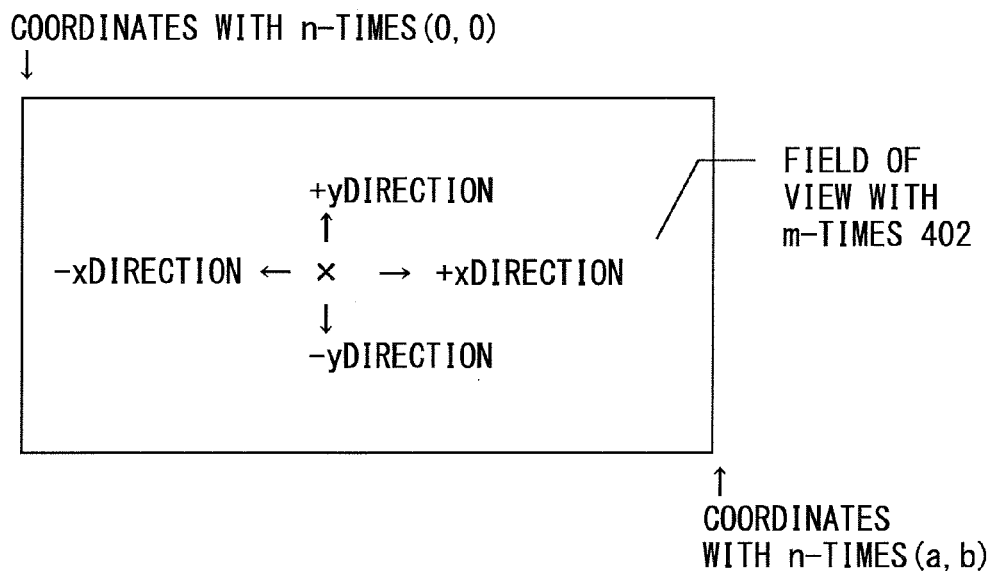
FIG. 31 illustrates the observation field of view and the movement directions of the observed image with the stage operation in the fifth embodiment.

FIG. 31 illustrates the observation field of view and the movement directions of the observed image with the stage operation in the present embodiment. When the X-direction stage input unit 501 performs a +X direction operation, the observation field of view moves in the "+X" direction in FIG. 31. In the same manner, the observation field of view can be moved in the "−X", "+Y" and "−Y" directions.

Meanwhile, for the stage operation by the observer using the X-direction stage input unit 501 and the Y-direction stage input unit 503, the movement amount of the stage with the operation is quantified as an encoder value by the X-direction stage movement encoder 502 and the Y-direction stage movement encoder 504. The encoder value communication unit 505 converts the quantified movement amount into a predetermined communication format and outputs it to the operation part 4.

For example, when the X-direction stage input unit 501 performs an operation in the "+X" direction for 1 pixel, the movement amount (1, 0) is transmitted to the operation unit 4 via the encoder value communication unit 505, in which the movement amount is represented by (X, Y), and indicates that there is no movement in the Y direction. Therefore, when a movement is performed obliquely downward to the bottom right on the page, for example, by +3 [pixels] in the X direction and −2 [pixels] in the Y direction, the movement amount is (+3, −2).

Figure 32:
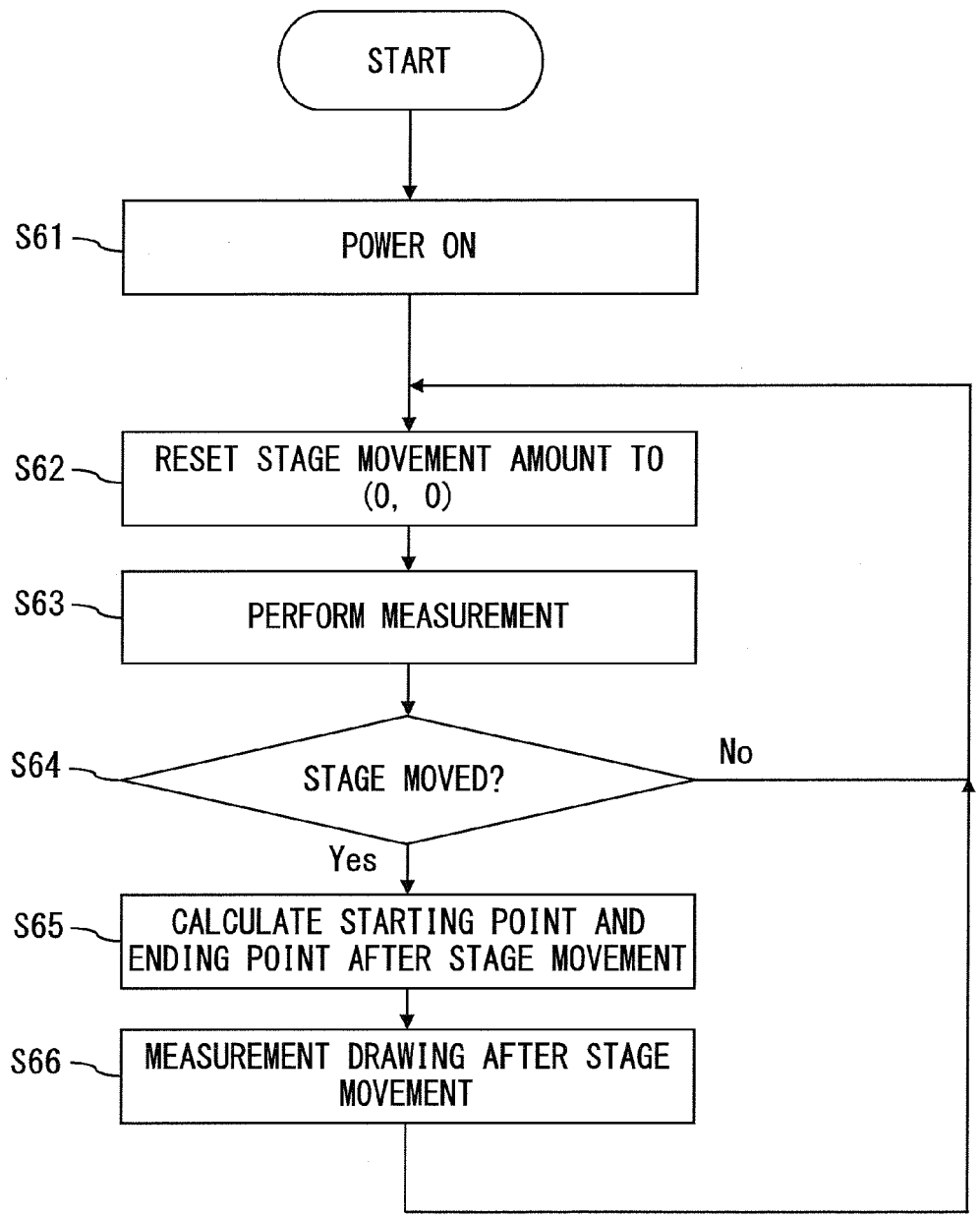
FIG. 32 illustrates the flow for the measurement between two points involving stage movement in the fifth embodiment.

FIG. 32 illustrates the flow for the measurement between two points involving stage movement in the present embodiment. The power of the microscope main body 1 and the digital camera system for a microscope 3 is turned ON (S61). Then, the X-direction stage movement encoder 502 and the Y-direction stage movement encoder 504 respectively reset the stage movement amounts, to $(\Delta X, \Delta Y) = (0, 0)$ (S62).

Next, in the same manner as in the embodiments described above, measurement between two points is performed (S63). When the stage movement is performed, the encoder value communication unit 505 combines the movement amount $\Delta X$ in the X direction and the movement amount $\Delta Y$ in the Y direction transmitted from the X-direction stage movement encoder 502 and the Y-direction stage movement encoder 504 as the movement amount $(\Delta X, \Delta Y)$ and transmits it to the operation unit 4.

The CPU 201 determines whether or not the stage 51 has been moved, on the basis of the stage movement amount $(\Delta X, \Delta Y)$ transmitted from the encoder value communication unit 505 (S64). When the CPU 201 determines that the stage has not moved ("No" in S64), the CPU 201 transmits, to the encoder value communication unit 505, an instruction to reset the stage movement amount. On the basis of the received instruction, the X-direction stage movement encoder 502 and the Y-direction stage movement encoder 504 respectively reset the stage movement amounts.

When the CPU determines in S64 that the stage has moved ("Yes" in S64), that is, if $(\Delta X, \Delta Y) = (p, q)$ [pixels] (at least one of p and q is not zero), the CPU 201 calculates the starting point and the ending point of the measurement between two points after the stage movement. Expressing the starting-point coordinates before the stage movement as $(A_s, B_s)$ and the ending-point coordinates as $(A_e, B_e)$, and the starting-point coordinates after the stage movement as $(A_s', B_s')$ and the ending-point coordinates as $(A_e', B_e')$, $$A_s' = A_s + p$$

$$B_s' = B_s + q$$

$$A_e' = A_e + p$$

$$B_e' = B_e + B_e + q,$$

according which the CPU 201 calculates the starting-point coordinates after the stage movement $(A_s', B_s')$ and the ending-point coordinates $(A_e', B_e')$ (S65). Then, the CPU 201 draws a straight line connecting the calculated starting-point coordinates and ending-point coordinates (S66). When the next measurement is to be performed, S62 and the following processes are performed again.

Meanwhile, the process that the drawing after the stage movement is performed after eliminating the straight-line drawing between the starting-point coordinates ($A_s$, $B_s$) and the ending-point coordinates ($A_e$, $B_e$) before the stage movement is the same as in the fourth embodiment.

According to the digital camera system for a microscope according to the present embodiment, in addition to the effects of the first through fourth embodiments, further, drawing of the measurement target can be performed in conjunction with stage movement. Therefore, there is no measurement error or losing sight of the measurement target, and the operability for the user is improved further.

Variation Example

A variation example of the present embodiment is explained. In this variation example, the stage movement amount in the fifth embodiment is added to the alert message displayed with the change of the objective magnification from n-times to m-times (n<m) in the second embodiment. That is, in the second embodiment, an alert is issued when the measurement target moves out of the observation field of view with the magnification change from n-times to m-times. Meanwhile, in the present embodiment, the distance of the measurement target from the field of view is displayed in the alert message.

Figure 33:
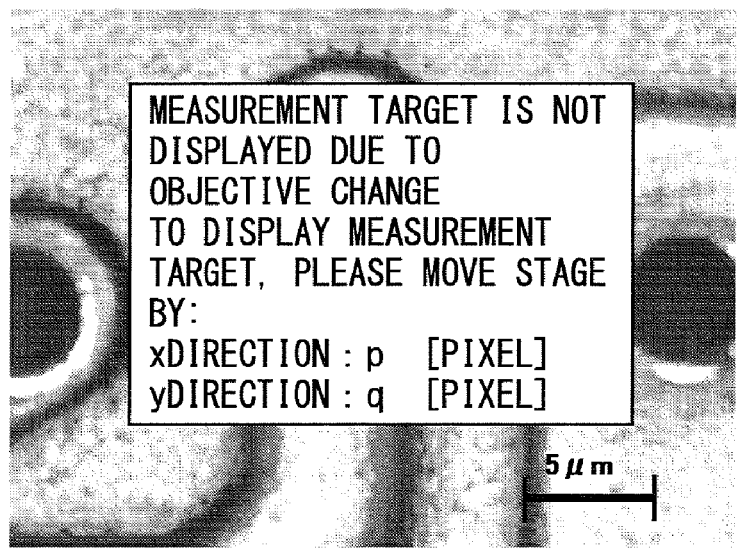
FIG. 33 illustrates an example of the alert message in the fifth embodiment (variation example).

FIG. 33 illustrates an example of the alert message in the present embodiment (variation example). As illustrated in FIG. 33, assuming the observation field of view area with the n-times magnification as (0, 0) to (a, b), the observation field of view area with the m-times magnification is ((m−n)a/2m, (m−n)b/2m) to ((m+n)a/2m, (m+n)b/2m).

When the observation target, measurement drawing with the n-times magnification is out of the area of ((m−n)a/2m, (m−n)b/2m) to ((m+n)a/2m, (m+n)b/2m), for example, the coordinates of the measurement drawing are assumed as (s, t) (for simplification, the starting point and the ending point of measurement between two points are assumed as being gathered at one point), and s and t are in the relationship of equation (5).

**start of equation (5)

$$s < (m-n)a/2m \text{ or } s > (m+n)a/2m$$

$$t < (m-n)b/2m \text{ or } t > (m+n)b/2m$$

**end of equation (5)

In the state in which s and t satisfy the condition of the equation (5), the stage movement amount (p, q) for making the measurement target displayed within the observation field of view with the m-times magnification needs to satisfy following equation (6).

**start of equation (6)

$$\text{if } s < (m-n)a/2m, \ p \geq -s+(m-n)a/2m$$

$$\text{if } s > (m+n)a/2m, \ p \geq -s+(m+n)a/2m$$

$$\text{if } t < (m-n)b/2m, \ q \geq -t+(m-n)b/2m$$

$$\text{if } t > (m+n)b/2m, \ q \geq -t+(m+n)b/2m$$

**end of equation (6)

The observer may be reminded to move the stage by a stage movement amount (p, q) that satisfies the above equation (6). For example, when the measurement is performed on a relatively marginal position on the screen of the observation field of view with the n-times magnification, the measurement target moves out of the observation field of view with the m-times magnification (n<m). In this case, as illustrated in FIG. 33, a message is displayed telling that the measurement target will appear in the observation field of view when a stage movement by (p, q) is performed.

Figure 34:
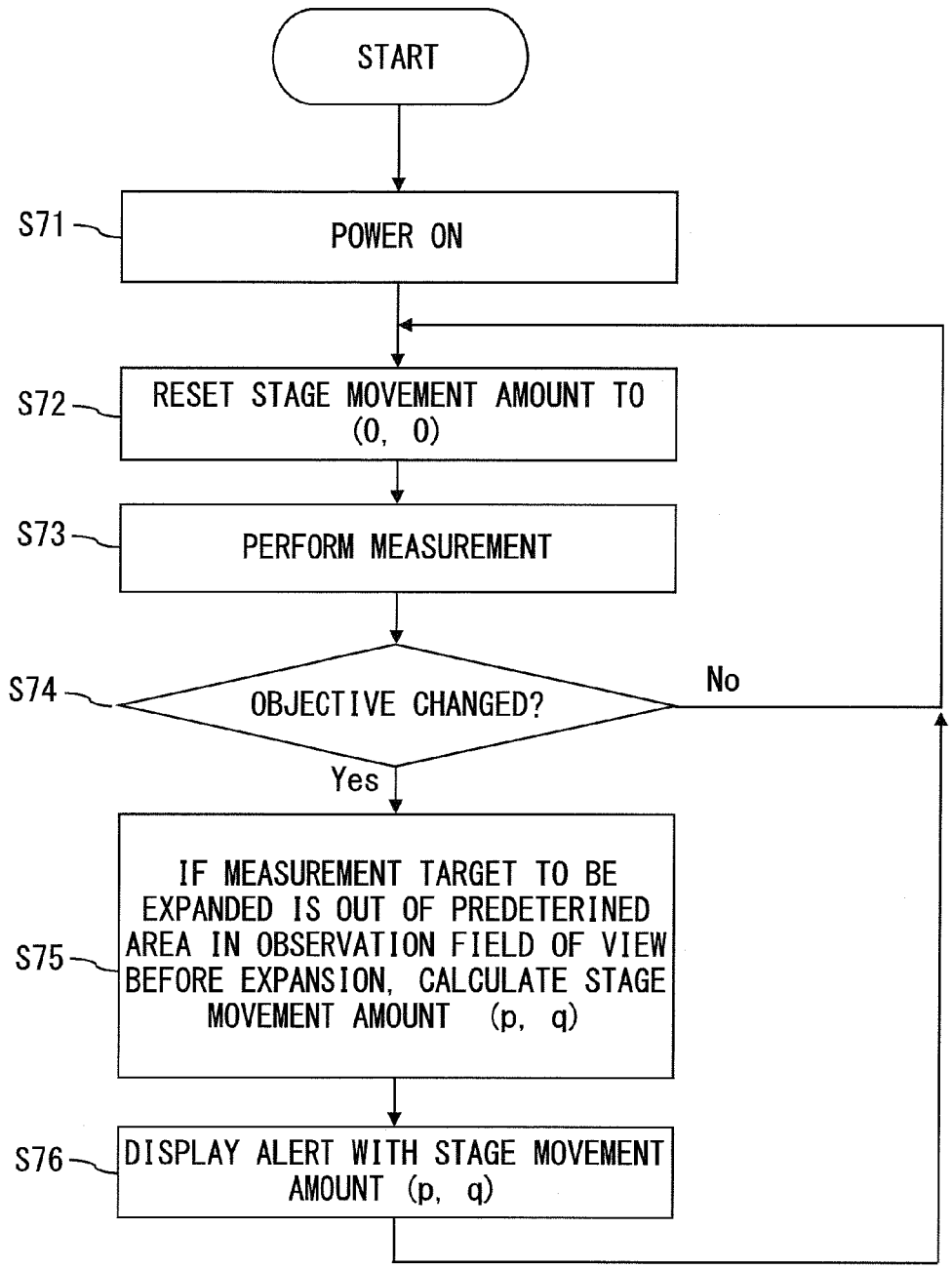
FIG. 34 illustrates the flow of displaying the alert of the stage movement amount in the fifth embodiment (variation example).

FIG. 34 illustrates the flow of displaying the alert of the stage movement amount in the present embodiment (variation example). The power of the microscope main body 1 and the digital camera system for a microscope 3 is turned ON (S71). Then, the x-direction stage movement encoder 502 and the Y-direction stage movement encoder 504 respectively reset the stage movement amounts to (0, 0) (S72).

After measurement between two points is performed (S73), the objective change determination unit 662 determines, in the same manner as in the second embodiment, whether or not there has been a change in the objective magnification (S74). When there has been no change in the objective magnification ("No" in S74), the CPU 201 transmits, to the encoder value communication unit 505, an instruction to reset the stage movement amount. On the basis of the received instruction, the X-direction stage movement encoder 502 and the Y-direction stage movement encoder 504 respectively reset the stage movement amounts.

In S74, when the objective magnification has been changed to n-times to m-times ("Yes" in S74), the CPU 201 operates as follows. When the measurement target to be expanded is out of a predetermined area in the observation field of view before the expansion, the CPU 201 calculates the stage movement amount (p, q) on the basis of the equation (6). That is, when the CPU 201 determines that the observation target and the measurement drawing with the n-times magnification are out of the area of ((m−n)a/2m, (m−n)b/2m) to ((m+n)a/2m, (m+n)b/2m), the CPU 201 calculates the stage movement amount (p, q) on the basis of the equation (6).

After that, the CPU 201 makes an alert message displayed within the field of view with the observation at m-times magnification, with the display of the stage movement amount (p, q) (S76).

According to the present embodiment, when the observer moves the stage in accordance with the alert, the measurement target that existed outside the observation field of view of the m-times magnification moves inside the observation field of view with the m-times magnification, making it possible to carry on the observation.

Sixth Embodiment

This embodiment realizes, in the first embodiment, the combination of the image and the measurement result for saving the image every time the measurement is performed. Meanwhile, in this embodiment, the same numerals are given to the same configurations and processes as in the first through fifth embodiment, and their description is omitted.

Figure 35:
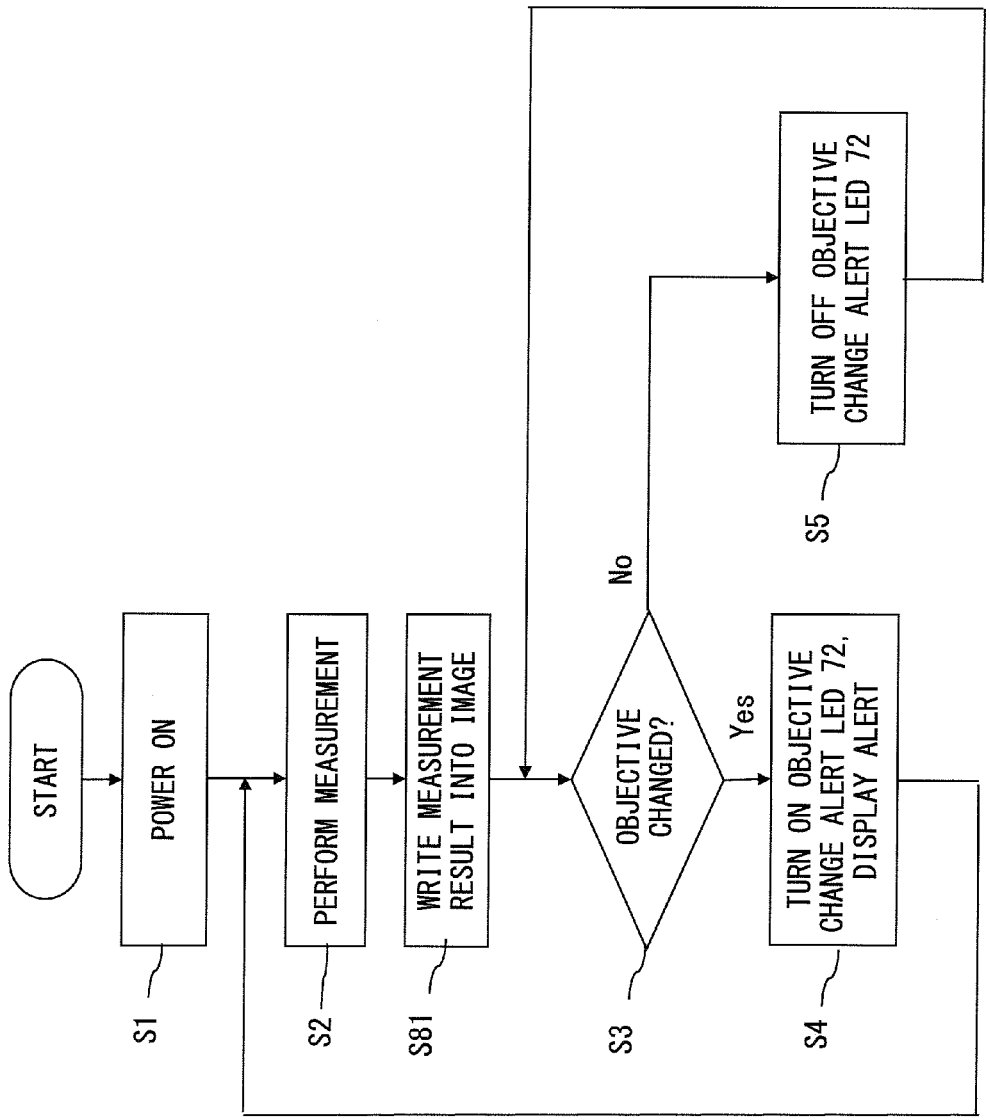
FIG. 35 illustrates the flow of combining the image and the measurement result and saving the image every time measurement is performed in the sixth embodiment.

FIG. 35 illustrates the flow of combining the image and the measurement result and saving the image every time measurement is performed, in the present embodiment. In FIG. 35, the process of S81 is added to the flow in FIG. 12.

The power of the microscope main body 1 and the digital camera system for a microscope 3 is turned ON (S1). Next, measurement is performed (S2). For example, it is assumed that the measurement between two points illustrated in FIG. 9 is performed. In FIG. 9, the distance between the two points is measured as "12 μm". For the measurement, after the input of the starting point and the ending point, the input of the display position of the measurement result value is completed.

After the completion of the measurement, the CPU 201 writes the measurement result into the image, and saves it in the removable medium 35 (S81). For the image saving, in the same manner as in the first embodiment, the measurement result is placed over the observed image through the observed image-character string combiner 64. At this time, the scale is also saved.

After that, the objective change determination unit 66 determines the presence/absence of an objective change (S3). The CPU 201 controls the objective change alert LED control unit 67 to turn on the objective change alert LED 72 (S4) or to turn it off (S5) in accordance with the determination result.

According to the digital camera system for a microscope 3 of the present embodiment, in addition to the effects of the respective embodiments described above, further, the measurement result is written into the image and recorded every time measurement is performed. Therefore, even when the observation magnification is changed or the observation field of view position is changed due to the stage movement after the measurement, the measurement result before the change is not affected. Therefore, there is no error in the magnification for observation or need for redoing the measurement, and the operability with the measurement is improved.

The present invention is not limited to the respective embodiments described above, and may take various configurations or embodiments without deviating from the scope and spirit of the present invention. For example, while the variation example of the fifth embodiment assumes a stage that is manually operated by the observer, it may be electrically controlled. In that case, the stage control may be performed so that the measurement target with the n-times magnification is always in the observation field of view or at the center of the field of view, even with another magnification such as m-times.

In addition, regarding the magnification change, while the magnification is changed by switching the objective lenses set on the revolver, a zoom lens may be installed in the microscope main body and the zoom rate may be changed. In this case, the configuration is made so that zoom rate information can be communicated from the microscope main body 1 to the operation unit 4.

Furthermore, for the measurement, while measurement of the distance between two points has been described, application may be made to other measurements, such as measurement of a circle, measurement of the distance between two circles, and so on.

In addition, while the present embodiment describes the measurement performed for a live image, application may be made to measurement performed for a reproduced image. The present invention may be applied especially to configurations that are not dependent on the frame of the live image, such as the variation examples of the first embodiment and the second embodiment, either for a live image or for a reproduced image.

As described above, according to the present invention, when the observation magnification is changed, an alert that the measurement result is incorrect can be issued, making it possible to reduce measurement errors. Therefore, the operability of the digital camera system for a microscope with the measurement is improved.

Meanwhile, when the observation magnification is changed, an alert that the measurement target before the magnification change does not exist in the screen or that the measured place before the change cannot be measured with the magnification after change is issued. Therefore, the operability of the digital camera system for a microscope with the measurement is improved.

Meanwhile, when the observation magnification is changed, the measurement drawing before the magnification change is redrawn in accordance with the magnification after the change.

As a result, the measurement does not need to be redone after the observation magnification is changed. Therefore, the operability of the digital camera system for a microscope with the measurement is improved.

Meanwhile, fine adjustment of misalignment between the observed image and the measurement drawing due to an eccentricity error with the observation magnification change can be performed. Therefore, the operability of the digital camera system for a microscope with the measurement is improved.

Meanwhile, an alert can be issued about the measurement target moving out of the observation field of view due to stage movement. As a result, there is no measurement error or losing sight of the measurement target. Therefore, the operability of the digital camera system for a microscope with the measurement is improved.

Meanwhile, the measurement result is written into the image and recorded every time measurement is performed. Therefore, even if the observation magnification is changed or the observation field of view position is changed due to stage movement after the measurement, the measurement result before the change is not affected. For this reason, there is no error in the magnification for observation or need for redoing the measurement. Therefore, the operability of the digital camera system for a microscope with the measurement is improved.

According to the present invention, the optimal measurement can be performed even if the magnification of the microscope is changed, which offers good usability and reduces operation mistakes.

What is claimed is:

1. An imaging system for a microscope, the imaging system comprising:

an imaging unit imaging an optical image from a microscope having hole identifying information transmitter;

a display unit displaying the imaged image;

a specifying unit setting, when at least a given position on the displayed image is specified by an operation of an user, a measurement target based on the specified position;

a measurement and drawing unit performing measurement of the measurement target set by the specifying unit and drawing of the measurement target, as well as making a measurement value obtained by the measurement displayed at a predetermined position on a screen, the measurement and drawing unit calculates, in an image after the change in the magnification, a position corresponding to the specified position in an image before the change in the magnification to reset a measurement target after the change in the magnification and, performs measurement and redrawing of the reset measurement target, and also makes a measurement value obtained by the measurement redisplayed at a predetermined position on the screen;

an obtaining unit obtaining:

one of a plurality of hole identifying information transmitted from the microscope for identifying one of a plurality of holes of a revolver holding a corresponding plurality of objective lens with different magnification values, ee the revolver is revolved to arrange one of the plurality of holes with an objective lens in an optical path of the microscope and a hole identifying information is associated with the magnification value of the optical lens held by the hole identified by the hole identifying information, and a magnification value of an objective lens, the objective lens being one of a plurality of objective lens with different magnification values that is arranged in the optical path of the microscope;

a magnification change determination unit determining whether there has been a change in an observation magnification of the microscope based on the hole identifying information or the magnification value obtained by the obtaining unit; and a control processor outputting when it is determined by the magnification change determination unit that there has been a change in the observation magnification of the microscope after the measurement value is displayed, a message that the measurement value is a value measured before the change in the magnification and does not correspond to an image after the change in the magnification.

2. The imaging system for a microscope according to claim 1, wherein the control processor determines, when the change in the observation magnification is performed from n-times to m-times (n<m), whether the measurement target with n-times moves out of an area of an observation field of view with m-times, and when the measurement target moves out of the area of the observation field of view with m-times, an alert is displayed accordingly.

3. The imaging system for a microscope according to claim 1, wherein the control processor determines, when the change in the observation magnification is performed from m-times to n-times (n<m), whether a measurement target with m-times becomes smaller than a minimum resolution for measurement in n-times observation, and when the measurement target becomes smaller than the minimum resolution for measurement in n-times observation, an alert is displayed accordingly.

4. The imaging system for a microscope according to claim 1, further comprising a position and size adjustment unit adjusting a position and a size of the redrawn measurement target.

5. The imaging system for a microscope according to claim 1, further comprising an eccentricity information holding unit holding eccentricity information for each magnification of the microscope, wherein the measurement and drawing unit calculates, in an image after the change in the magnification, a position corresponding to the specified position in an image before the change in the magnification, in accordance with the eccentricity information.

6. The imaging system for a microscope according to claim 1, further comprising a stage movement amount obtaining unit obtaining, from the microscope, a movement amount of a stage of the microscope;

wherein the measurement and drawing unit moves, on basis of the stage movement amount, the specified position consecutively, and performs drawing of the measurement target at the position after the move.

7. The imaging system for a microscope according to claim 1, wherein the control processor determines, when the change in the observation magnification is performed from n-times to m-times (n<m), whether the measurement target with n-times moves out of an area of an observation field of view with m-times, and when the measurement target with n-times moves out of the area of the observation field of view with m-times, makes a movement amount of a stage of the microscope for moving the measurement target inside the area of the observation field of view with m-times displayed.

8. The imaging system for a microscope according to claim 1, further comprising:

a drawing information writing unit writing drawing information drawn by the measurement and drawing unit into an image in which the measurement target is imaged; and a saving unit saving the image in which the drawing information has been written.

9. A microscope system comprising:

a microscope including a stage movable at least in a direction perpendicular to an optical-axis direction;

an imaging unit imaging an optical image from the microscope having hole identifying information transmitter;

a display unit displaying the imaged image;

a specifying unit setting, when at least a given position on the displayed image is specified by an operation of an user, a measurement target based on the specified position;

a measurement and drawing unit performing measurement of the measurement target set by the specifying unit and drawing of the measurement target, as well as making a measurement value obtained by the measurement displayed at a predetermined position on a screen, the measurement and drawing unit calculates, in an image after the change in the magnification, a position corresponding to the specified position in an image before the change in the magnification to reset a measurement target after the change in the magnification, and performs measurement and redrawing of the reset measurement target, and also makes a measurement value obtained by the measurement redisplayed at a predetermined position on the screen;

an obtaining unit obtaining:

one of a plurality of hole identifying information transmitted from the microscope for identifying one of a plurality of holes of a revolver holding a corresponding plurality of objective lens with different magnification values, the revolver is revolved to arrange one of the plurality of holes with an objective lens in an optical path of the microscope and a hole identifying information is associated with the magnification value of the optical lens held by the hole identified by the hole identifying information, and a magnification value of an objective lens, the objective lens being one of a plurality of objective lens with different magnification values that is arranged in the optical path of the microscope;

a magnification change determination unit determining whether there has been a change in an observation magnification of the microscope based on the hole identifying information or the magnification value obtained by the obtaining unit; and a control processor outputting when it is determined by the magnification change determination unit that there has been a change in the observation magnification of the microscope after the measurement value is displayed, a message that the measurement value is a value measured before the change in the magnification and does not correspond to an image after the change in the magnification.

10. The microscope system according to claim 9, wherein the control processor determines, when the change in the observation magnification is performed from n-times to m-times (n<m), whether the measurement target with n-times moves out of an area of an observation field of view with m-times, and when the measurement target moves out of the area of the observation field of view with m-times, an alert is displayed accordingly.

11. The microscope system according to claim 9, wherein the control processor determines, when the change in the observation magnification is performed from m-times to n-times (n<m), whether a measurement target with m-times becomes smaller than a minimum resolution for measurement in n-times observation, and when the measurement target becomes smaller than the minimum resolution for measurement in n-times observation, an alert is displayed accordingly.

12. The imaging system for a microscope according to claim 9, further comprising
a position and size adjustment unit adjusting a position and a size of the redrawn measurement target.

13. The imaging system for a microscope according to claim 9, further comprising
an eccentricity information holding unit holding eccentricity information for each magnification of the microscope, wherein
the measurement and drawing unit calculates, in an image after the change in the magnification, a position corresponding to the specified position in an image before the change in the magnification, in accordance with the eccentricity information.

14. The imaging system for a microscope according to claim 9, further comprising
a stage movement amount obtaining unit obtaining, from the microscope, a movement amount of a stage of the microscope; wherein
the measurement and drawing unit moves, on basis of the stage movement amount, the specified position consecutively, and performs drawing of the measurement target at the position after the move.

15. The microscope system according to claim 9, wherein the control processor determines, when the change in the observation magnification is performed from n-times to m-times (n<m), whether the measurement target with n-times moves out of an area of an observation field of view with m-times, and when the measurement target with n-times moves out of the area of the observation field of view with m-times, makes a movement amount of a stage of the microscope for moving the measurement target inside the area of the observation field of view with m-times displayed.

16. The microscope system according to claim 9, further comprising:
a drawing information writing unit writing drawing information drawn by the measurement and drawing unit into an image in which the measurement target is imaged; and
a saving unit saving the image in which the drawing information has been written.

* * * * *